(12) United States Patent
Gregory

(10) Patent No.: US 9,746,207 B1
(45) Date of Patent: Aug. 29, 2017

(54) TRACKING MODULES INCLUDING TIP/TILT ADJUSTABILITY AND CONSTRUCTION FEATURES

(75) Inventor: Christian T. Gregory, La Cresenta, CA (US)

(73) Assignee: SOLARRESERVE TECHNOLOGY, LLC, Santa Monica, CA (US)

( * ) Notice: Subject to any disclaimer, the term of this patent is extended or adjusted under 35 U.S.C. 154(b) by 1028 days.

(21) Appl. No.: 13/418,947

(22) Filed: Mar. 13, 2012

Related U.S. Application Data

(60) Provisional application No. 61/465,216, filed on Mar. 16, 2011.

(51) Int. Cl.
F24J 2/52 (2006.01)
F24J 2/54 (2006.01)

(52) U.S. Cl.
CPC .............. *F24J 2/5417* (2013.01); *F24J 2/52* (2013.01); *F24J 2/5266* (2013.01)

(58) Field of Classification Search
CPC .................................. F24J 2/16; F24J 2/5417
USPC ....... 126/600, 606, 607, 608, 696; 52/173.3; 108/159.11; 136/246, 244
See application file for complete search history.

(56) References Cited

U.S. PATENT DOCUMENTS

| | | | | |
|---|---|---|---|---|
| 567,618 | A * | 9/1896 | Severy ........................ | 126/607 |
| 2,244,978 | A * | 6/1941 | Tinnerman ........... | A47B 96/068 248/239 |
| 2,251,723 | A * | 8/1941 | Tinnerman ................ | F16B 5/06 411/529 |
| 2,267,379 | A * | 12/1941 | Tinnerman .............. | F16B 5/125 411/516 |
| 2,535,879 | A * | 12/1950 | Tinnerman ............ | E04F 19/062 24/294 |
| 2,670,512 | A * | 3/1954 | Flora ....................... | F16B 5/125 24/289 |
| 3,153,975 | A * | 10/1964 | Rapata .................... | F16B 5/128 24/295 |
| 3,430,904 | A * | 3/1969 | Soltysik ................... | F16L 3/13 248/73 |
| 3,889,531 | A * | 6/1975 | Suga .......................... | 73/150 R |
| 4,090,498 | A * | 5/1978 | Benson ........................ | 126/574 |
| 4,137,897 | A * | 2/1979 | Moore ......................... | 126/605 |
| 4,145,021 | A * | 3/1979 | Gaechter et al. ............. | 248/371 |
| 4,202,321 | A * | 5/1980 | Volna ........................... | 126/605 |
| 4,245,895 | A * | 1/1981 | Wildenrotter ................. | 359/848 |
| 4,276,872 | A * | 7/1981 | Blake et al. .................. | 126/578 |
| 4,285,567 | A * | 8/1981 | Hansen ........................ | 126/600 |

(Continued)

*Primary Examiner* — Avinash Savani
*Assistant Examiner* — Deepak Deean
(74) *Attorney, Agent, or Firm* — Kagan Binder, PLLC

(57) ABSTRACT

Tracking modules are effectively provided that can be arranged as systems for positioning devices, such as reflectors. A preferred reflector is small and light in comparison to prior art reflectors so that components can be utilized within reflector construction and support structure that are sufficiently stiff to accurately hold a reflector in place under expected operational drive-torque, gravity and wind loads. At the same time, a single person can install a reflector, easily overcoming a retention mechanism spring force so as to positively engage a reflector in position. This is achieved without the need for any tools, through a combination of a retention mechanism and a spring feature design. Arrangements of tracking modules are included for easier manufacture, transport of systems and installment.

14 Claims, 25 Drawing Sheets

(56) References Cited

U.S. PATENT DOCUMENTS

| | | | |
|---|---|---|---|
| 4,295,621 A * | 10/1981 | Siryj | 248/183.2 |
| 4,300,537 A * | 11/1981 | Davis | 126/600 |
| 4,368,962 A * | 1/1983 | Hultberg | 353/3 |
| 4,383,520 A * | 5/1983 | Huebl et al. | 126/605 |
| 4,402,582 A * | 9/1983 | Rhodes | 353/3 |
| 4,456,332 A | 6/1984 | Anderson | |
| 4,459,972 A * | 7/1984 | Moore | 126/600 |
| 4,586,488 A * | 5/1986 | Noto | 126/578 |
| 4,765,309 A | 8/1988 | Legge | |
| 4,890,599 A * | 1/1990 | Eiden | 126/606 |
| 4,995,377 A * | 2/1991 | Eiden | 126/605 |
| 5,181,335 A * | 1/1993 | Todd | 40/606.13 |
| 5,517,204 A * | 5/1996 | Murakoshi et al. | 343/765 |
| 6,123,067 A * | 9/2000 | Warrick | 126/593 |
| 6,284,968 B1 * | 9/2001 | Niesyn | 136/246 |
| 6,914,578 B1 * | 7/2005 | Menahem | 343/877 |
| 6,959,993 B2 * | 11/2005 | Gross et al. | 359/853 |
| 7,156,088 B2 | 1/2007 | Luconi | |
| 7,252,084 B2 * | 8/2007 | Pawlenko et al. | 126/605 |
| 7,374,137 B2 * | 5/2008 | Staney | 248/122.1 |
| 7,435,134 B2 * | 10/2008 | Lenox | 439/567 |
| 7,968,791 B2 * | 6/2011 | Do et al. | 136/246 |
| 8,046,961 B1 * | 11/2011 | Cutting et al. | 52/173.3 |
| 8,100,122 B2 * | 1/2012 | Collins et al. | 126/623 |
| 8,153,945 B2 | 4/2012 | Hickerson et al. | |
| 8,276,329 B2 * | 10/2012 | Lenox | 52/173.3 |
| 8,381,718 B1 * | 2/2013 | Luconi | 126/606 |
| 8,511,297 B2 * | 8/2013 | McNeil-Yeckel et al. | 126/600 |
| 8,542,156 B2 * | 9/2013 | Patel | 343/765 |
| 8,578,928 B2 * | 11/2013 | Clavijo Lumbreras | 126/600 |
| 8,745,935 B2 * | 6/2014 | DuPont et al. | 52/173.3 |
| 8,763,602 B2 * | 7/2014 | Lehle | 126/605 |
| 8,835,747 B2 * | 9/2014 | Miller et al. | 136/246 |
| 8,881,720 B2 * | 11/2014 | Currier | 126/607 |
| 8,933,322 B2 * | 1/2015 | Banin et al. | 136/246 |
| 8,981,271 B1 * | 3/2015 | Risner et al. | 250/203.4 |
| 2004/0231660 A1 * | 11/2004 | Nakamura | 126/600 |
| 2004/0238025 A1 * | 12/2004 | Shingleton | 136/246 |
| 2005/0217665 A1 * | 10/2005 | Luconi | 126/696 |
| 2005/0284467 A1 * | 12/2005 | Patterson | 126/580 |
| 2006/0096586 A1 * | 5/2006 | Hayden | 126/600 |
| 2008/0011288 A1 * | 1/2008 | Olsson | 126/576 |
| 2009/0038608 A1 * | 2/2009 | Caldwell | 126/600 |
| 2009/0095281 A1 * | 4/2009 | Barnes et al. | 126/601 |
| 2009/0188487 A1 * | 7/2009 | Jones et al. | 126/600 |
| 2010/0089389 A1 * | 4/2010 | Seery et al. | 126/608 |
| 2010/0185333 A1 * | 7/2010 | Oosting | 700/279 |
| 2011/0067691 A1 * | 3/2011 | Bellacicco et al. | 126/680 |
| 2011/0067750 A1 | 3/2011 | Ueda | |
| 2011/0108019 A1 * | 5/2011 | Minick et al. | 126/600 |
| 2011/0146663 A1 * | 6/2011 | Ezawa et al. | 126/600 |
| 2011/0174359 A1 * | 7/2011 | Goei et al. | 136/246 |
| 2011/0220596 A1 * | 9/2011 | Cusson et al. | 211/41.1 |
| 2011/0265784 A1 * | 11/2011 | Chang et al. | 126/607 |
| 2012/0012101 A1 * | 1/2012 | Trujillo et al. | 126/601 |
| 2012/0174962 A1 * | 7/2012 | Koningstein et al. | 136/246 |
| 2012/0218652 A1 * | 8/2012 | Stone et al. | 359/853 |
| 2013/0032135 A1 * | 2/2013 | Waterhouse et al. | 126/572 |
| 2013/0048056 A1 * | 2/2013 | Kilgore et al. | 136/251 |
| 2013/0152915 A1 * | 6/2013 | Marten et al. | 126/600 |
| 2013/0192150 A1 * | 8/2013 | DuPont et al. | 52/173.3 |
| 2014/0339383 A1 * | 11/2014 | Lowe et al. | 248/161 |

* cited by examiner

TRACKING MODULES INCLUDING TIP/TILT ADJUSTABILITY AND CONSTRUCTION FEATURES

CROSS REFERENCE TO RELATED APPLICATIONS

This application claims priority to U.S. Provisional application No. 61/465,216 filed Mar. 16, 2011, titled TIP-TILT TRACKER, the entire disclosure of which is incorporated herein by reference for all purposes.

FIELD OF THE INVENTION

The present invention relates generally to the field of solar tracking devices and system as are used in conjunction with photovoltaic panels, lenses or reflectors for the purpose of converting solar energy into other usable forms of energy, such as electricity or a high-temperature working fluid. In particular, this invention pertains to relatively small trackers that can be combined as a system to be effective, but that because of the reduced size, benefit from a reduction in associated cost, improved performance and easier installation.

BACKGROUND OF THE INVENTION

The use of heliostats in the field of concentrating solar power (CSP) is well established in the prior art. A typical CSP system includes a centralized tower and a plurality of ground mounted heliostats. The centralized tower serves as the focal point onto which individual heliostats redirect sunlight. The concentration of sunlight at the tower focus increases, as a general statement, with the number of heliostats. The high concentration of solar energy is converted by the tower into other useful forms, typically heat which can then be used either directly or be used to generate steam to power electrical generators. It should be noted that it is also possible to convert the solar energy directly into electricity through the use of any number of photovoltaic devices generally referred to as solar cells.

Heliostats generally include one or more mirrors to redirect sunlight, support structure to hold the mirror(s) and to allow the mirror(s) to be articulated, and actuators such as motors to effect the articulation. At a minimum, heliostats must provide two degrees of rotational freedom in order to redirect sunlight onto a fixed tower focus point. Heliostat mirrors are generally planar, but could possibly have more complex shapes. Heliostat articulation can follow an azimuth/elevation scheme by which the mirror rotates about an axis perpendicular to the earth's surface for the azimuth and then rotates about an elevation axis that is parallel to the earth's surface. The elevation axis is coupled to the azimuth rotation such that the direction of the elevation axis is a function of the azimuth angle. Alternatively heliostats can articulate using a tip/tilt scheme in which the mirror rotates about a fixed tip axis that is parallel to the earth's surface. The tilt axis is orthogonal to the tip axis but its direction rotates as a function of the tip axis. The tilt axis is parallel to the earth's surface when the heliostat mirror normal vector is parallel to the normal of the earth's surface.

Most heliostats themselves and systems or collections thereof are controlled by computer control systems. For example, a computer can be provided with a latitude and longitude of the heliostat's position on the earth along with the time and date at that location. Using this information along with known planetary movement information, a control computer can calculate the direction of the sun as seen from the mirror, e.g. its compass bearing and angle of elevation. Then, given the direction of the target, a control computer can calculate the direction of the required angle-bisector. Based upon this data, the control computer can send control signals to tip and tilt controls, such as including drive systems, often utilizing stepper motors, as conventionally known for turning the mirror to the correct alignment. This sequence of operations is then normally repeated frequently to keep the mirror properly oriented.

A single heliostat of certain prior art systems can be of a size of about two square meters or greater. A conventional design for a heliostat's reflective components utilizes what is known as a second surface mirror. A sandwich-like mirror structure classically includes, inter alia, a steel structural support, a layer of reflective silver, and a top protective layer of glass. Such a heliostat is often referred to as a glass/metal heliostat. Alternative designs incorporate recently developed adhesives, composite materials, and thin film designs to bring about stronger and lighter materials to reduce costs and weight. Some examples of alternative reflector designs are silvered polymer reflectors, glass fiber reinforced polyester sandwiches (GFRPS), and aluminized reflectors. Problems with conventional designs of heliostats and mirrors arise from the size and mass of such structures as they are to be accurately controlled. The greater the mass of all components along with normal reflector sizes, generally means the more robust the supporting and controlling components must be as such components may also require precision machining and manufacturing. Such qualifications increase expense in the utilization of stronger materials and in the design needs for accurate control of all movements by precision drive mechanisms and associated controls.

SUMMARY OF THE PRESENT INVENTION

The present invention overcomes disadvantage and shortcomings of the prior art on multiple aspects. These advantageous aspects of the present invention are based at least in part on the provision of reflectors or other supported units along with tracker modules that utilize methods and techniques for reducing mass and dimensions of reflectors and/or the tracking modules so as to reduce the effects of weight and torque as are experienced for supporting and permitting movement of supported devices and reflectors.

In one aspect of the present invention, a tracker module is provided for allowing a controlled range of motion to a device that is to be supported by the tracker module, wherein the tracker module comprises a frame structure including at least a mast; a tip/tilt mechanism supported by the frame structure and comprising a housing for operatively supporting a tilt shaft that is rotational along a tilt axis and a tip shaft that is rotational along a tip axis that is rotationally oriented at an angle to the tilt axis; a first mounting feature that is rotational with one of the tilt shaft and the tip shaft and that is shaped to engage and disengage with a complementary feature of a device to be supported by the tracker module by flexing of at least a portion of the first mounting feature; and a second mounting feature that is also rotational with the same respective shaft as the first mounting feature and that is also shaped to engage and disengage with a complementary feature of a device to be supported by the tracker module. Preferably, a spacing between the first and second mounting features as axially positioned along the one of the tilt shaft and the tip shaft causes a force to be created between the first and second mounting features when a device to be supported by the tracker module is assembled to the tracker module from a flexing of the first mounting feature.

Another aspect of the present invention is based upon the provision of a tracker module as above, and further in combination with a reflector as a device that is supported by the tracker module, the reflector including a third mounting feature that is complementary to the first mounting feature and a fourth mounting feature that is complementary to the second mounting feature, and wherein the third and fourth mounting features are provided as part of a reflector support structure and are spaced from one another within the reflector support structure so as to cause a flexing of the first mounting feature as the reflector is mounted to the tracker module and to cause the first mounting feature to remained flexed sufficiently to create the force between the first mounting and the second mounting feature with the third and fourth mounting features positioned in complementary positions to the first and second mounting features, respectively.

In yet another aspect of the present invention, an assembly having at least three tracker modules is created. Each tracker module provides for a controlled range of motion to a device that is to be supported by the tracker module. The assembly preferably comprises a frame structure for a first tracker module including at least a mast element and a frame member that operatively extends from the mast element for connection with a frame structure of a second tracker module, wherein at least one end of the frame member includes a hinge feature to provide for a pivotal connection with a mast element of one of the mast element of the first tracker module and the second tracker module; and a tip/tilt mechanism supported by the frame structure of each tracker module and comprising a housing for operatively supporting a tilt shaft that is rotational along a tilt axis and a tip shaft that is rotational along a tip axis that is rotationally oriented at an angle to the tilt axis. By this construction, assembly of tracker modules can be collapsible from an expanded assembly of spaced tracker modules by pivoting the mast elements and frame members as permitted by the hinge feature of each frame member so as to create a back and forth compact assembly of the tracker modules as positioned adjacent to one another.

DESCRIPTION OF THE INVENTION

Figure 1:
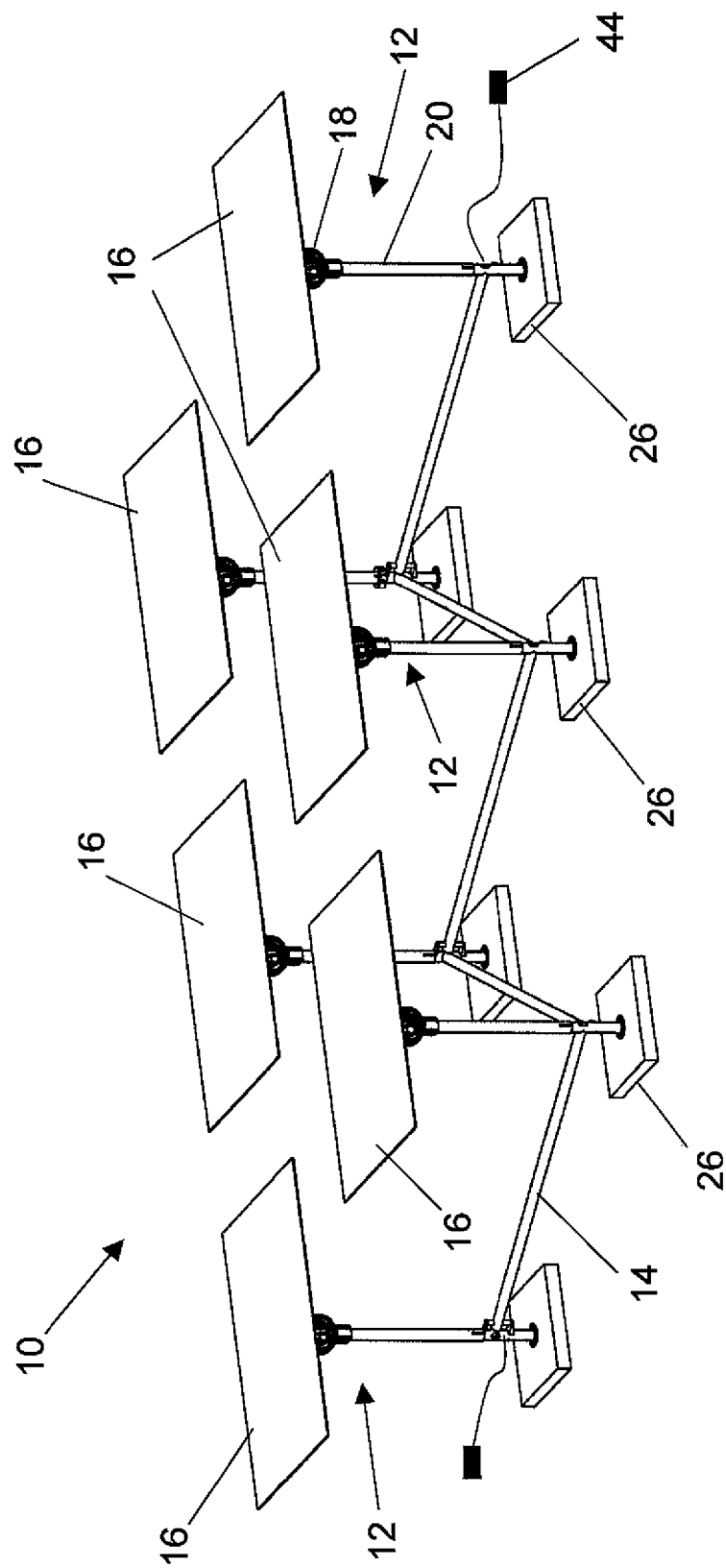
FIG. 1 is a perspective view of an expanded tracker module assembly with ballast installed.

With initial reference to FIG. 1, the present invention relates to an assembly 10 of tracker modules 12 that can be physically and operatively interconnected as a system by associated support structure, such as including frame members 14, the purpose of which is to create a collection of photovoltaic panels, lenses or reflectors, illustrated as mirrors or reflectors 16, that can be controlled for a common purpose. A tracker module 12 in accordance with the present invention is also referred to as a heliostat module as such a tracker module 12 is exemplified as comprising a movable and controllable mirror or reflector 16.

Figure 2:
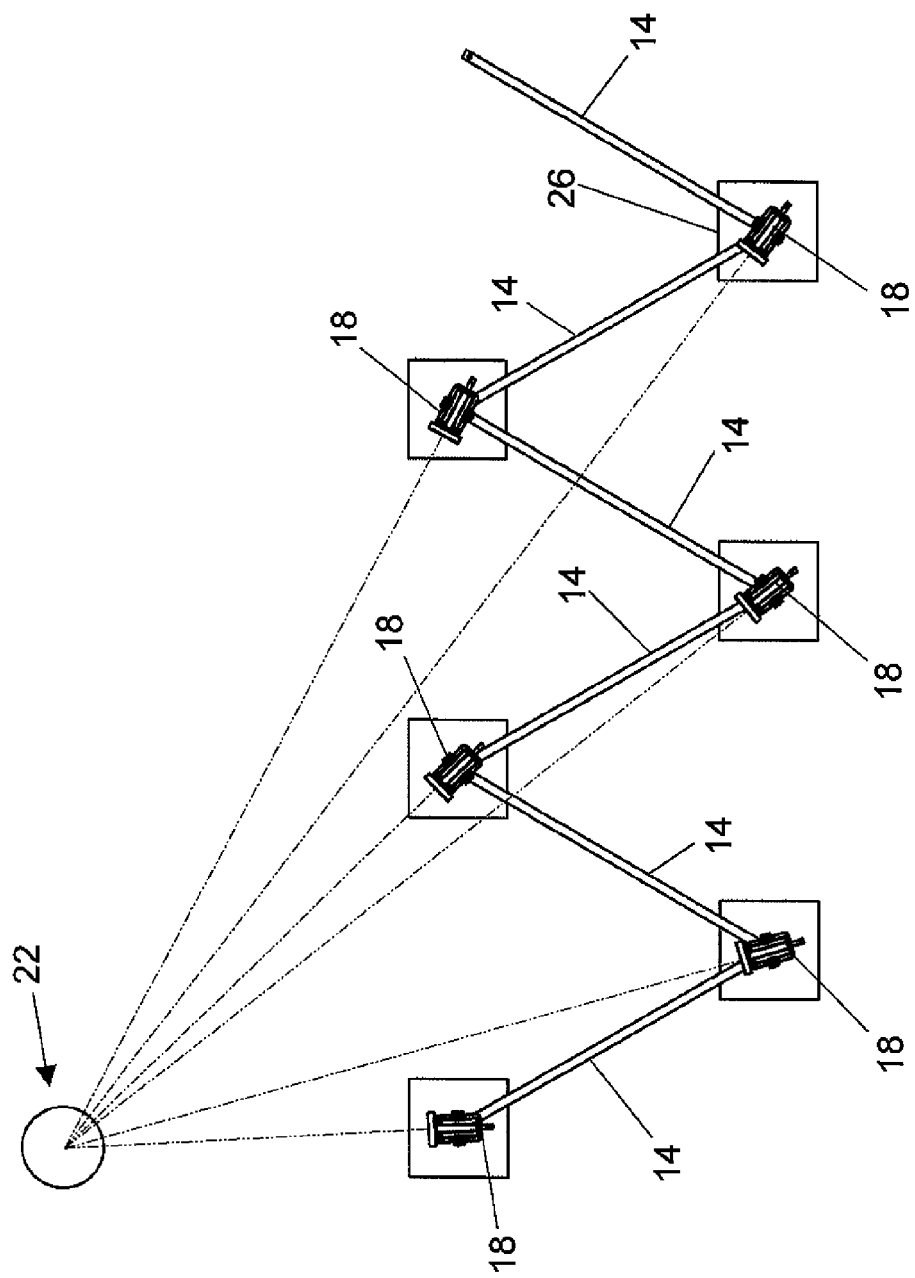
FIG. 2 is a top view showing multiple tip/tilt mechanisms or tracker drive assemblies that are mounted to the same frame structure assembly, each individually aligned with a common receiver target.

Each tracker module 12 preferably includes a tip/tilt mechanism 18, as shown in FIG. 2, that is operatively provided atop a mast 20, which masts 20 can be individually rotatable for individual aiming at a receiver target 22. It is, however, also contemplated that the masts 20 need not be rotatable at all for simplicity of manufacturing and installation, where such masts 20 can instead be installed at desired angular positions. A receiver target 22 can comprise any device that is a common target of a collection of reflectors 16 or other devices, as known or developed such as including a power tower provided with photovoltaic devices for generating electrical energy from collected and concentrated sunlight. The present invention also relates to methods for fabricating, handling, and installing a tracker module 12, by itself or within a system 10 comprising a plurality of tracker modules 12 with reflectors 16 or the like and that are mechanically coupled to a support structure, such as by frame members 14. Although the following description of aspects of the present invention are focused on the creation and use of a system 10 as a concentrating solar "power tower" application, the apparatus and methods are applicable to systems for tracking a movable object from by at least one, and preferably a collection of tracking modules 12, and more preferably for directing energy or the like to a common receiver target 22.

The present invention teaches a tracker module assembly 10 and design architectures for assembly variations that allow for low cost, ease of deployment, adaptability to a variety of installation sites and means to improve optical efficiency in a power-tower application, as an example. An installed tracker module assembly 10 would include a plurality of tracker modules 12, each preferably with a tip/tilt mechanism 18, described in greater detail below, an associated reflector 16 with an operative connection with a tip/tilt mechanism, also described in greater detail below, and with each reflector 16 and tip/tilt mechanism 18 combination connected to a mast 20 as part of an expanded frame structure, such as shown in FIG. 3.

Figure 3:
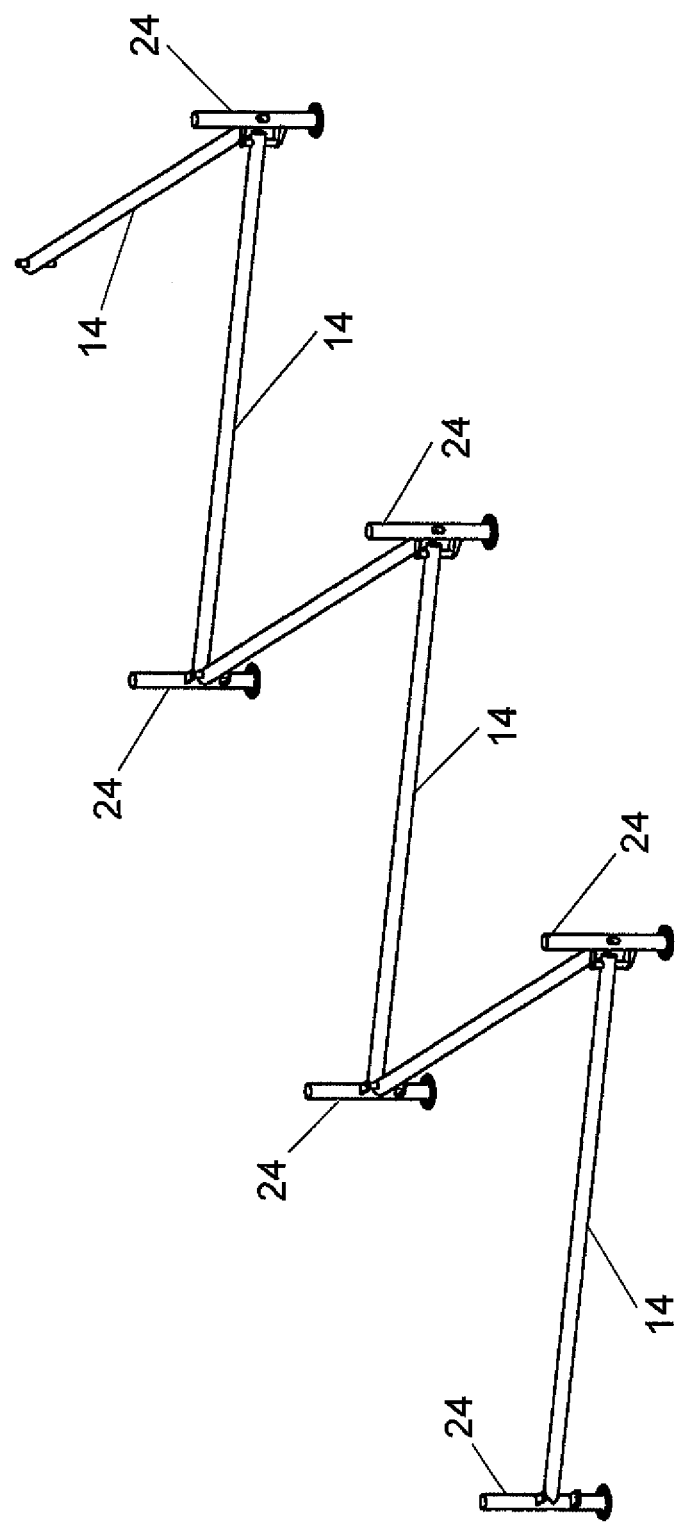
FIG. 3 is a perspective view of an expanded frame structure assembly.

The expanded frame structure of FIG. 3 includes a plurality of mast supports 24 along with a plurality of frame members 14 that interconnect the mast supports 24. In a typical arrangement, the mast supports 24 would be oriented to be vertical so as to also support the masts 20 vertically. The frame members 14, according to this example, would be substantially horizontally disposed for interconnecting the mast supports 24. Preferably, each mast 20 is slidably fit within a similarly shaped and slightly larger opening of a respective mast support 24 for rotationally supporting the masts 20. For maintaining each mast support 24 in position, a ballast foot 26 is, in one example as shown in FIG. 1, connected to each mast support 24 by a flange 28 (see FIG. 4) fixed with each mast support to provide a desired mast support orientation. Appropriate conventional connectors, adhesives, and other bonding or welding techniques can be used for these connections.

In arranging such assembly of tracker modules, frame structure can be expanded and positioned as desired, preferably providing room necessary to accommodate each reflector 16. An installer can position each ballast foot 26, for example, underneath a flange 28 of each frame segment. Ballast is meant to include any weighting means that is effective to facilitate location of a mast support 24 in a determined arrangement so as not to move substantially during use of the assembly 10 under normal conditions as may be experienced from time to time over any useful period. Such ballast may be provided underneath a support mast 24, as shown, or may be provided over the flange 28 or any other feature of a mast support for holding it down to the support surface or ground for the installation. Moreover, depending on the installation site, the mast supports 24 can be adhered directly to a mounting surface, or otherwise effectively positioned in a substantially fixed location by conventional or developed other techniques so as to eliminate or reduce the need for ballast altogether. Combinations of such securement methods are also contemplated.

Figure 4:
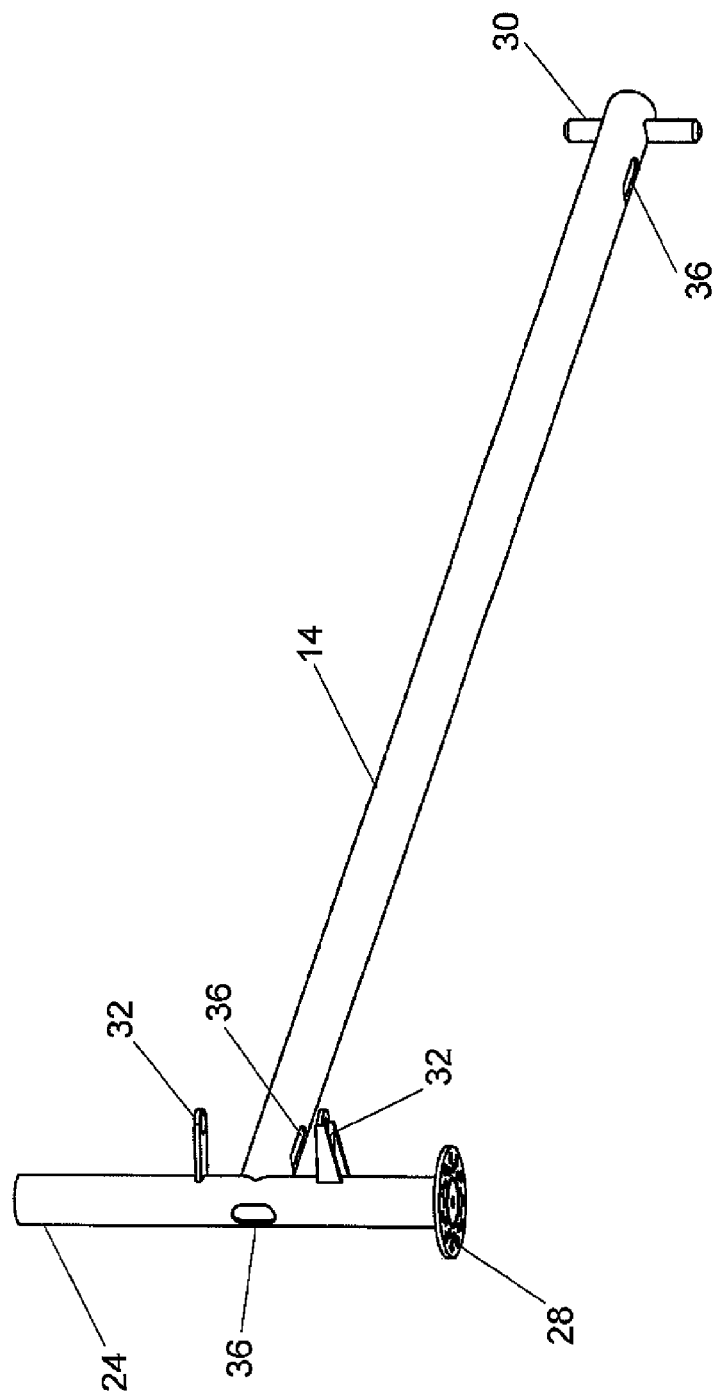
FIG. 4 is a bottom perspective view of a frame segment.
Figure 5:
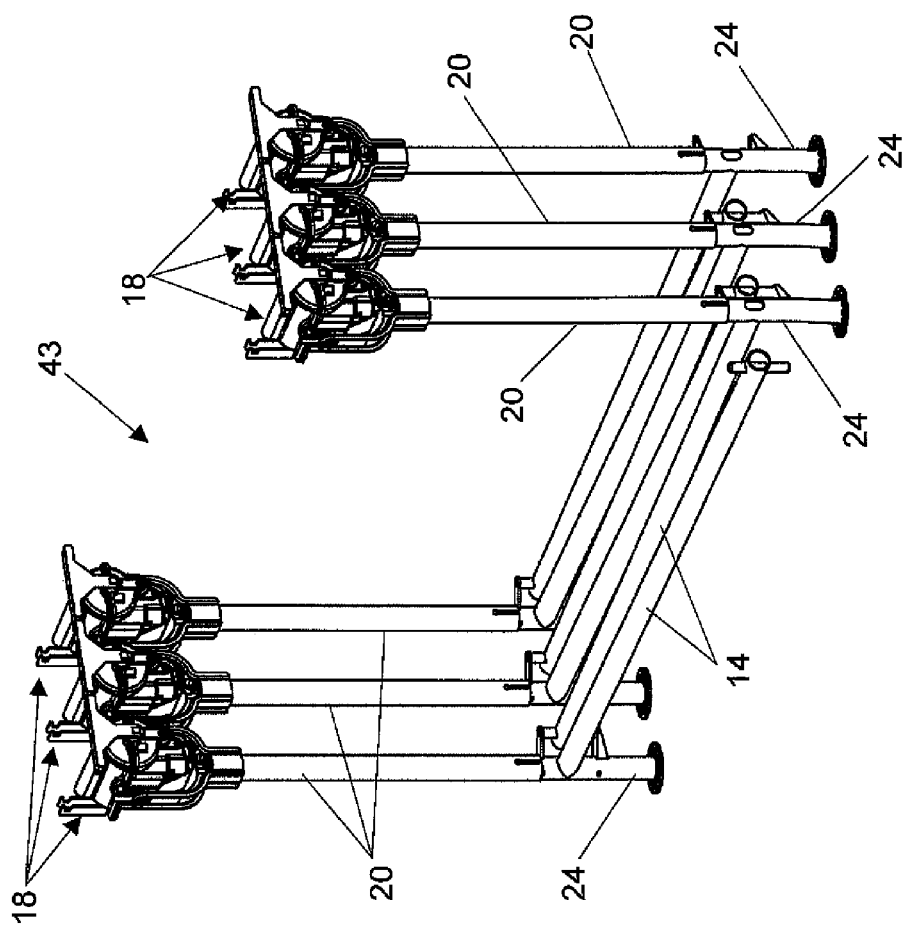
FIG. 5 is a perspective view of a collapsed frame structure assembly tip/tilt mechanisms installed.

The frame structure assembly for an assembly 10 of tracker modules 12 includes a plurality of frame segments (as shown in FIG. 3) with each frame segment preferably including a frame member 14 (to be arranged substantially horizontally according to a preferred installation architecture) that is fixed to a mast support 24. Specifically, one end of the frame member 14 is preferably fixedly connected to a mast support 24, for eventual indirect connection with a mast 20, while the other end of the frame member 14 is preferably provided with a hinge feature. As shown in FIG. 4, a hinge post 30 can be provided as the hinge feature that is to be fitted between a pair of spaced hinge tabs 32 that are provided to a mast support 24. Preferably, the hinge tabs 32 are provided with one tab 32 (as defined axially along the mast support 24) to each side of a fixation point of the mast support 24 with the frame member 14. Moreover, it is preferable that the spaced hinge tabs 30 are arranged along a mast support 24 at a radially offset angle from the fixation point of the mast support 24 and frame member 14 so as to facilitate movement and adjustment of the mast supports 24 relative to one another effectively, and to preferably permit a frame structure to be collapsible to a position as shown in FIG. 5 from an expandable position. The hinge tabs 32 can connect to the hinge post 30 of an adjacent frame segment, such as by way of a pin or bolt 34 that is positioned through a first tab 32, a bore of the hinge post 30 and then a second tab 32, in that order, so as to create a pivotable hinge (see FIG. 6).

Figure 6:
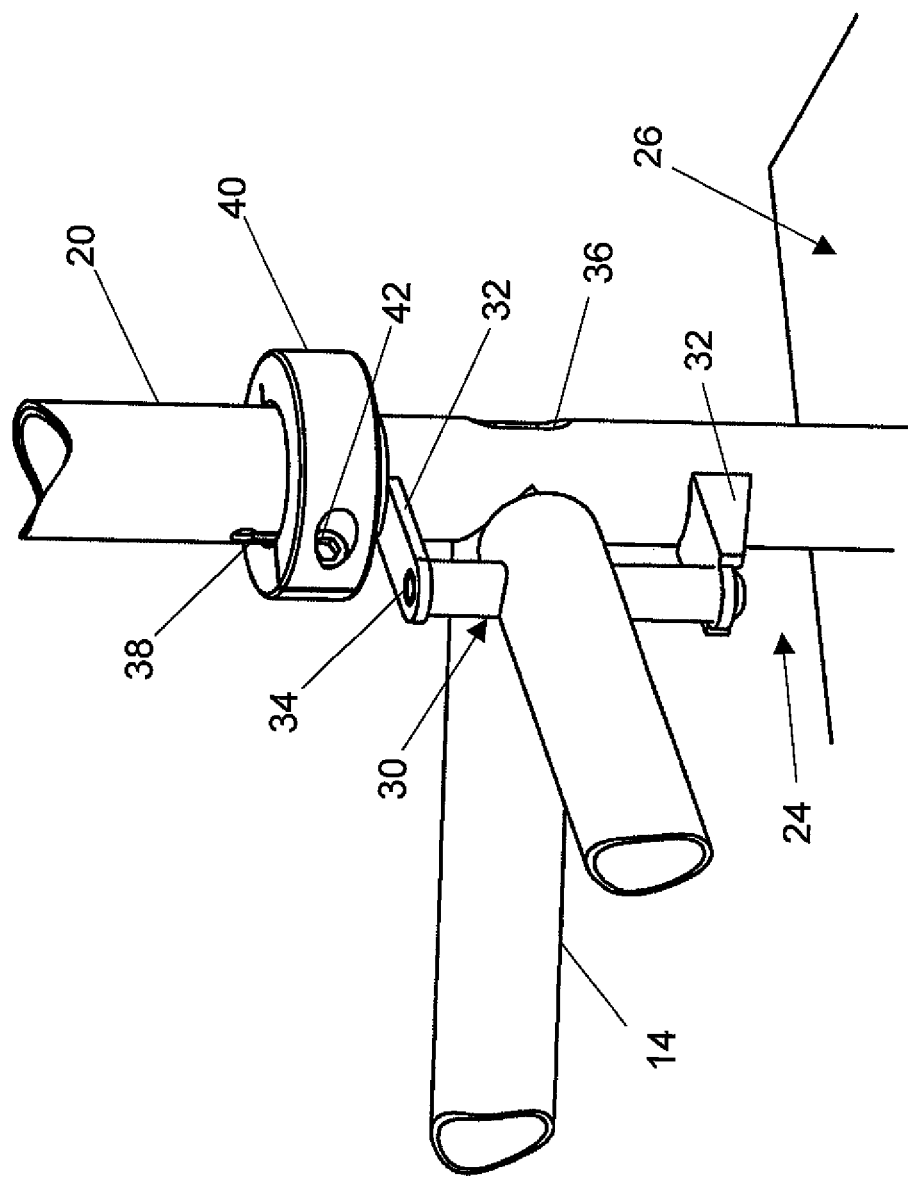
FIG. 6 is a perspective view showing a clamping mechanism, which facilitates mast indexing relative to the frame structure assembly.

Components of the frame structure assembly including the mast supports 24 and the frame members 14, along with the masts 20 preferably comprise hollow tubes (of any cross-sectional shape) so that the masts 20 and mast supports 24 can be telescoped together (described below) and so as to provide interconnecting passages within the frame structure assembly, as such may be assembled in any desired architecture. Such interconnected passages accommodate any number of wires, or a wiring harness, and other control or structural components as may be provided within the frame structure assembly. As shown in FIGS. 4 and 6, access ports 36 are preferably provided at strategic locations along the mast supports 24 and frame members 14 to facilitate running of any such electrical wire(s) and any other control or structural lines within and through the frame structure assembly.

FIG. 6 shows a close up detail of a hinge connection. These hinges allow the frame structure assembly to be collapsed into a small volume for shipping and ease of handling. The tilt/tip mechanisms 18 and wiring can be factory-installed to the frame structure assembly to reduce the number of installation steps at the site.

FIG. 6 also shows a manner of providing an operative rotational connection of a mast 20 with a mast support 24. Preferably, as shown, a mast has an internal diameter slightly larger than the external diameter of the mast support 24. The reverse is similarly contemplated. Also, one or more relief slots 38 may be provided extending from an end of the mast 20, as also shown, to allow flexibility to the end of the mast as that end of the mast 20 is slid over the end of the mast support 24. As discussed above, the mast 20 is preferably rotationally adjustable to the mast support 24 to allow for infinite rotational positions of each tip/tilt mechanism 18.

Each mast 20 can be individually indexed relative to the frame structure, with a clamping feature or other adjustment mechanism. This provides a more consistent reflection from each reflector 16 toward its target 22 over the course of the day, for example, when following the sun as part of a solar collection system. Such can be achieved by indexing a plane defined by the sweep of a tilt axis 48 as it rotates about a tip axis 46, with a radial axis defined by the target 22 and tracker module 12, such as a heliostat.

FIG. 6 shows one approach to provide this adjustability through the use of a collar clamp 40 surrounding the bottom end of a mast 20. A relief slot 38 cut into the mast 20 allows it to compress by tightening a collar clamp bolt 42 and thus reducing the diameter of the collar clamp 40, for locking the mast 20 rotationally and axially onto the outside diameter of a mast support 24. By loosening the collar clamp bolt 42, the mast 20 can be rotated around the mast support 24 to a desired position, and then re-locked in place by tightening the collar clamp bolt 42. The rotational adjustability of the mast 20 could be achieved using a variety of other mechanisms, such as a thread interface between a mast 20 and a mast support 24. Additionally, the rotational functionality as provided to allow for rotational positioning of the tip/tilt mechanisms 18 and thus the effective interface surfaces could be moved to a different location, such as at the top of a mast 20, which could be specifically located at an operative connection of a mast 20 with the tip/tilt mechanism 18, as described below. FIG. 2 shows a plan view of a frame structure with six drive assemblies individually indexed towards a target 22, with the dashed lines representing the alignment of the plane defined by a tilt axis 48 rotated about a tip axis 46.

Figure 7:
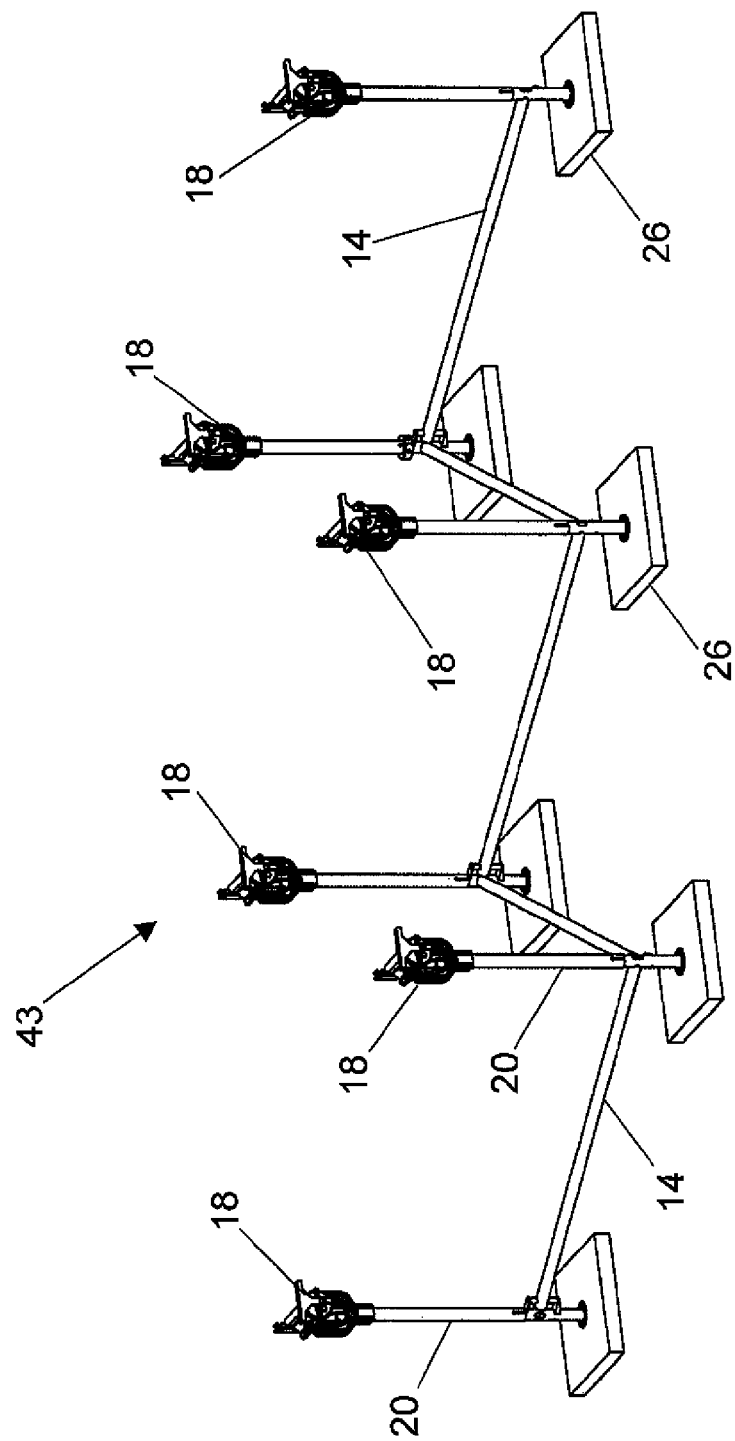
FIG. 7 is a perspective view of an expanded frame structure assembly with tip/tilt mechanisms installed.
Figure 8:
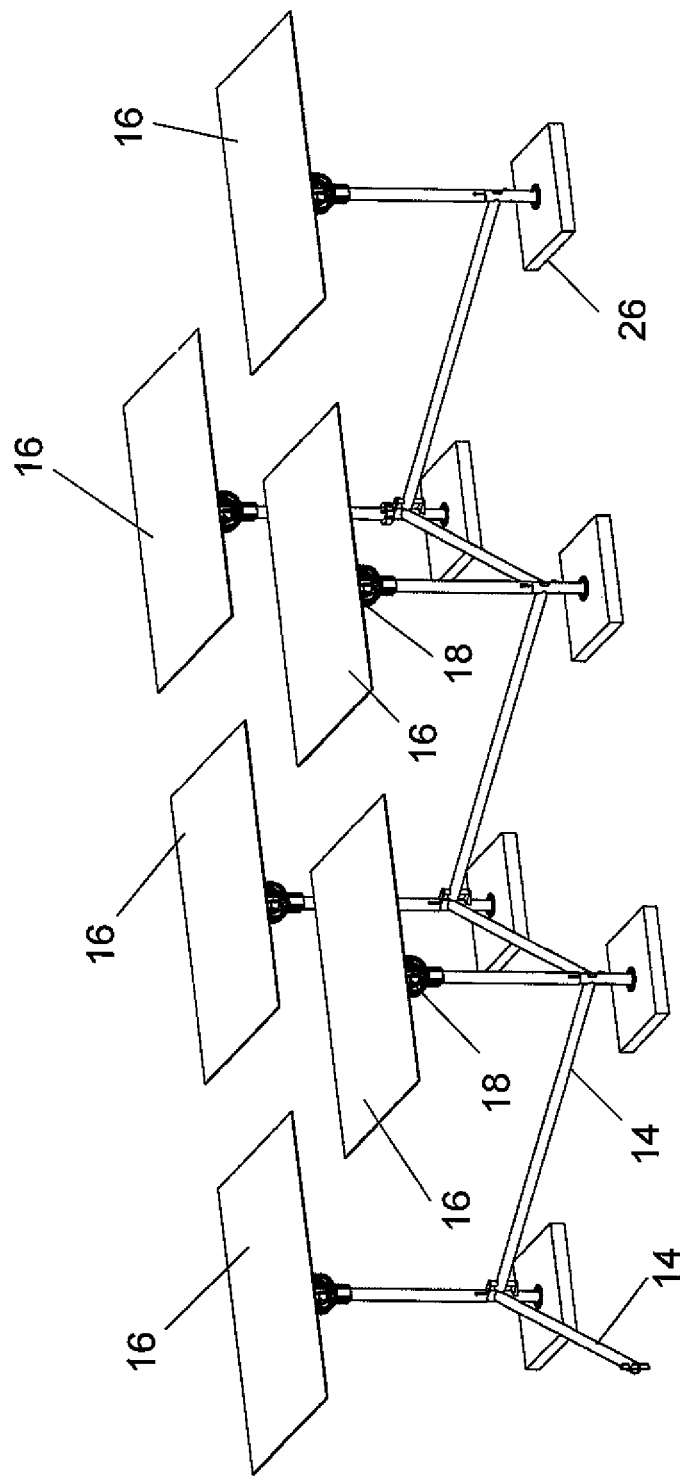
FIG. 8 is a perspective view of an expanded tracker module assembly shown with an extra frame segment to couple adjacent tracker module assemblies.

FIGS. 5 and 7 show an example of a pre-assembled portion of a system of the present invention without the reflectors 16, as such can be taken to a site for usage, which system portion is hereafter referred to as a frame/drive sub-assembly 43. Due to a preferred light-weight construction of such a frame/drive sub-assembly 43, the entire collapsed unit (shown in FIG. 5) can be preferably light enough to be lifted, positioned, expanded (as shown in FIG. 7) and installed by an individual. Reflectors 16 can then be easily connected, such as by a snap fit on to the tip/tilt mechanism of each mast, with integral attachment features (described below) that do not require the use of any tools for installation. FIG. 8 illustrates the frame/drive sub-assemblies 43 similar to FIG. 7 with reflectors 16 connected and positioned for usage, as controlled by tip/tilt mechanisms 18, as described below.

As above, electrical wiring can be routed inside of the expandable frame segments to shield it from the elements, with connectors on both ends to electrically couple adjacent tracker module(s) 12. Each tracker module 12 assembly may include, for example, on the order of five to ten tip/tilt mechanisms 18, with more or less depending on the unique installation characteristics of the site. Additionally, the tracker module assemblies 10 located in a single installation may include different numbers of tip/tilt mechanisms 18 such as can be provided on different tracker module assemblies 10 to account for the unique topography of that particular site.

Another step of an installation process in accordance with the present invention is preferably to connect assemblies 10 of a plurality of tracker modules 12 together electrically via connectors 44, as illustrated in FIG. 1. Preferably, internal wiring for a plurality of tracker modules 12 as provided as an assembly 10 is done during manufacturing of an assembly 10, so that such assemblies 10 can be arranged relative to one another in the field and connected there to one another by connectors 44. As such, any number of tracker modules 12 can be interconnected electrically and physically (such as by frame members 14) to create a tracker module assembly 10, and such tracker module assemblies 10 are then also preferably electrically (and potentially also physically) and operatively interconnected together, as desired to provide an operative system of reflectors 16, for example, directed at a receiver target 22.

These design features result in a tracker module system architecture that greatly improves installation time and cost. One variation of this approach involves the use of masts 20 with different heights on the same assembly. By orienting the frame assemblies such that a shortest mast 20 is closest to the receiver target 22, such as a tower, with a tallest mast 20 furthest away, the blocking component of optical efficiency within a tracker module assembly can be improved.

Figure 9:
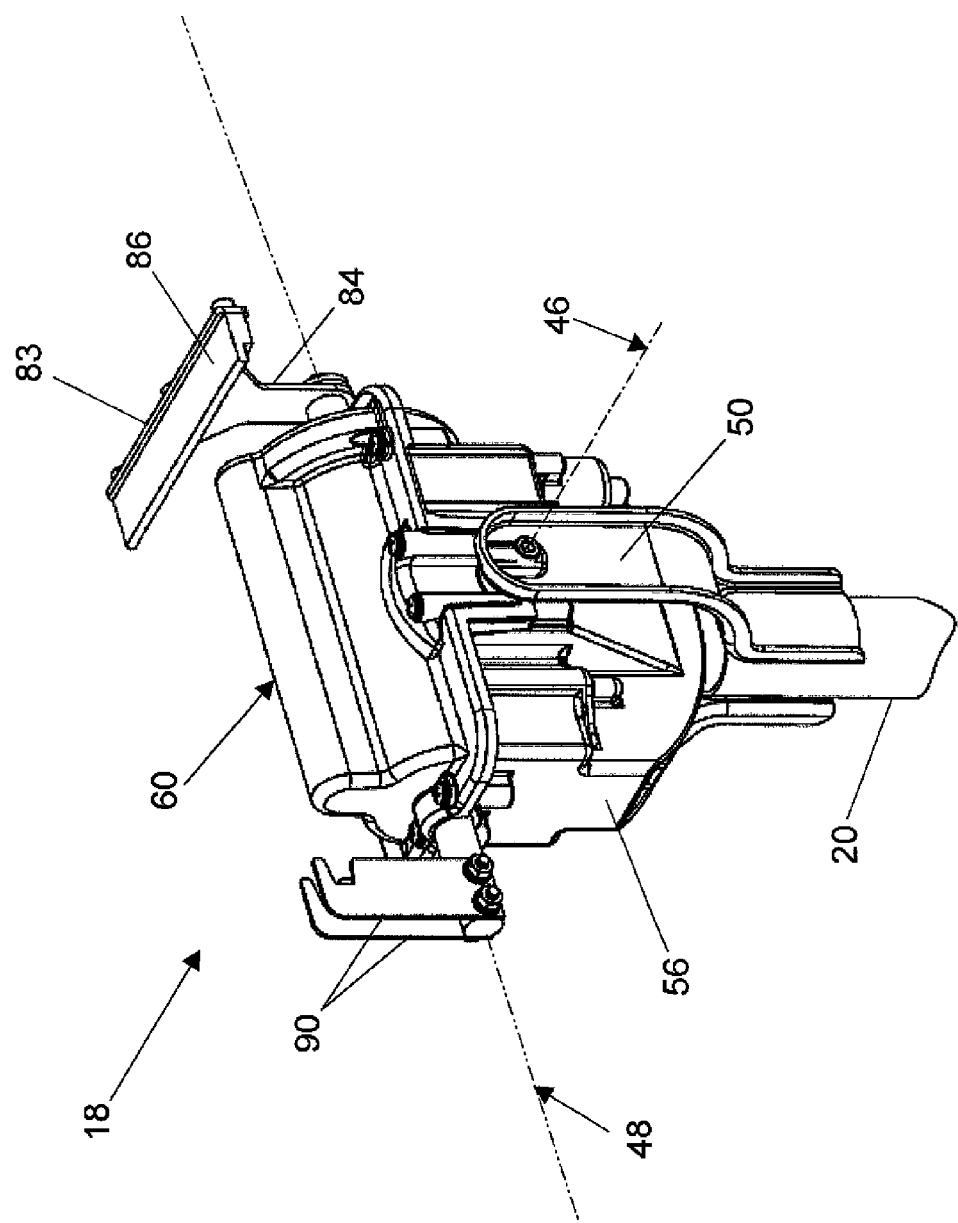
FIG. 9 is a perspective view of a tracker tip/tilt mechanism or drive assembly.

Referring now to FIG. 9, the present invention preferably comprises tip/tilt mechanisms 18 including a drive assembly architecture, which directly addresses important tracker design requirements, such as low-cost, robustness, reliability and energy capture. To reduce cost, this design approach starts with the use of drive components that are small in size, but which still meet load requirements. In particular, relatively small reflector 16 sizes and light-weight materials and construction techniques reduce mass and torque loads advantageously according to preferred aspects of the present invention, and as discussed more within the following description.

Figure 10:
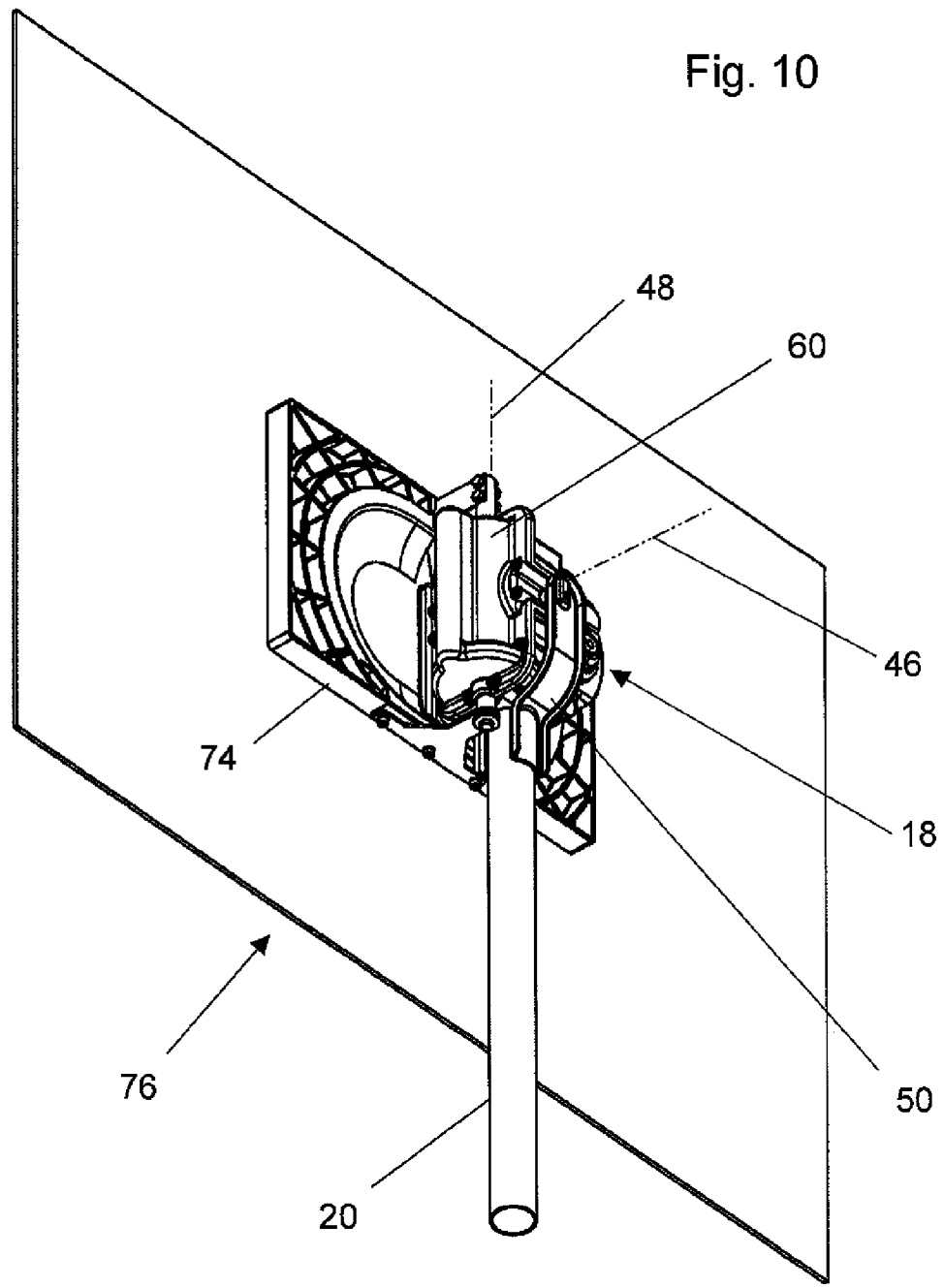
FIG. 10 is a bottom perspective view showing a reflector module assembly rotated 90 degrees about the tip axis and 90 degrees around the tilt axis.
Figure 11:
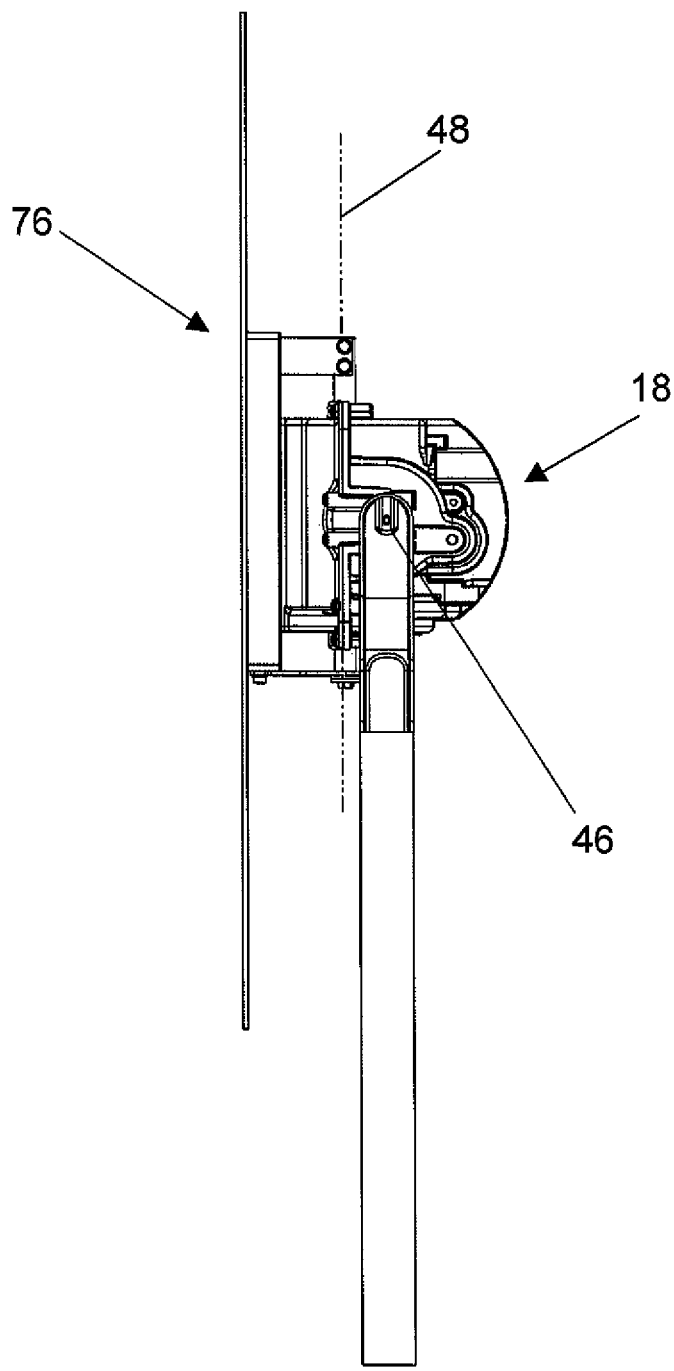
FIG. 11 is a side view showing a reflector assembly rotated 90 degrees around the tip axis.

In a preferred tip/tilt mechanism 18 of the present invention, a tip axis 46 can be maintained in an orientation approximately parallel to the ground and fixed to the support structure. A tilt axis 48 is also shown in FIG. 9 as coupled with the tip axis 46 and is preferably oriented 90 degrees to it. In the illustration, tilt axis 48 and the tip axis 46 are both shown as horizontally oriented with the tilt axis 48 vertically spaced above the tip axis 46. The tilt axis 48 is thus radially movable about the tip axis 46 to limit points around the tip axis 46, at least, on either side at which the tilt axis 48 becomes oriented vertically, or otherwise stated where the tilt axis 48 rotates by at least 90 degrees from the FIG. 9 position in either rotational direction around the tip axis 46. FIG. 10 illustrates a tip/tilt mechanism 18 with a reflector 16 connected to move with the tilt axis 48 with the reflector 16 rotated 90 degrees around the tip axis 46 and 90 degrees around the tilt axis 48. FIG. 11 illustrates a similar tip/tilt mechanism 18 with a reflector 16 rotated 90 degrees around the tip axis 46.

A reflector 16 is preferably operatively mounted to the tilt axis 48, such as described below, and thus can be aligned approximately parallel to it so that when the reflector 16 is completely horizontal the tilt axis 48 is also parallel to the ground. Working together, the tip and tilt axes 46 and 48, respectively, can position the reflector 16 at any angle within the range of motion constraints of the drive mechanism.

Figure 12:
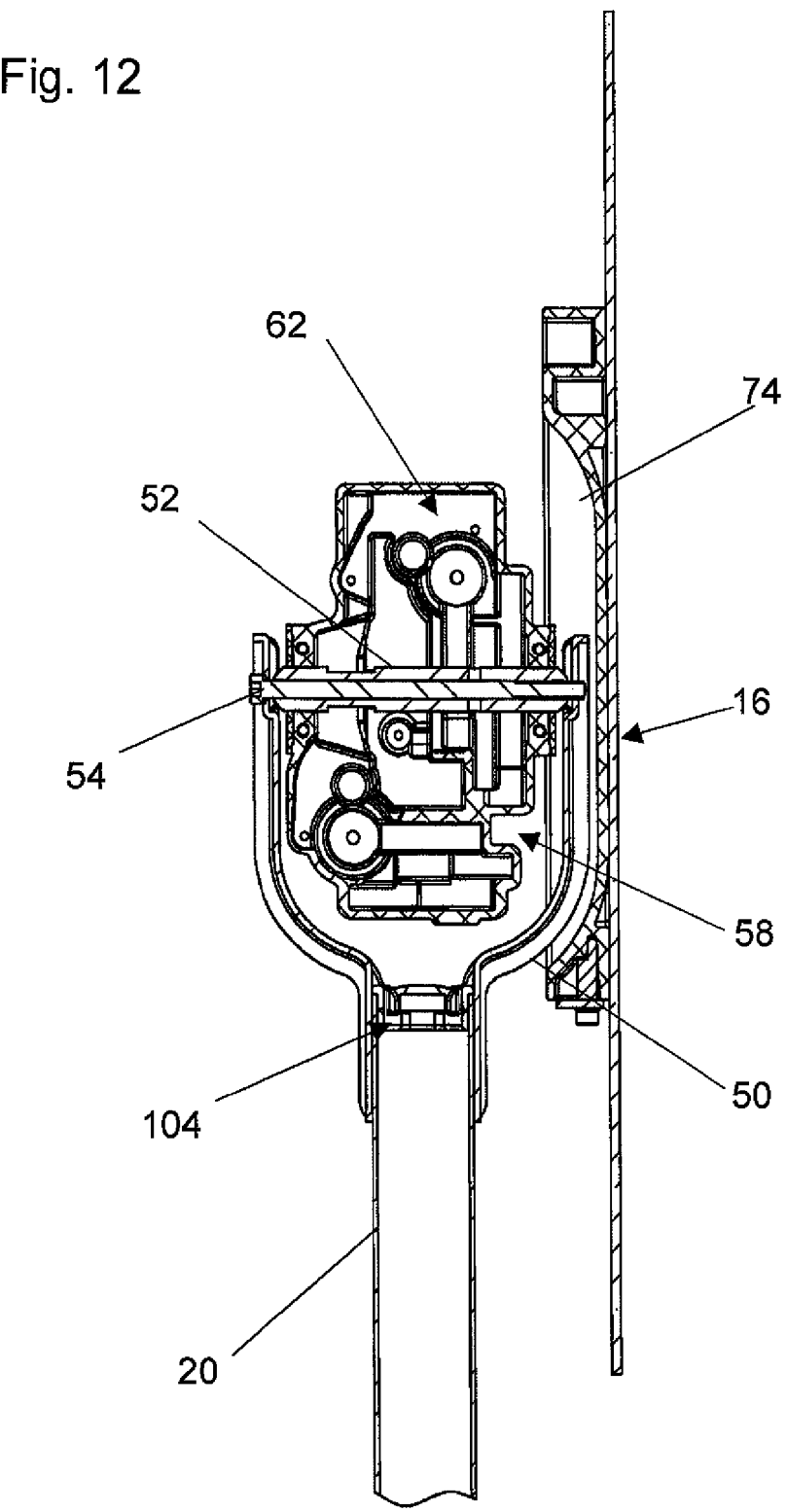
FIG. 12 is a partial vertical section view through the tip axis shaft centerline, with the reflector assembly in a vertical orientation, which shows a tight clearance between the yoke and reflector support structure.
Figure 14:
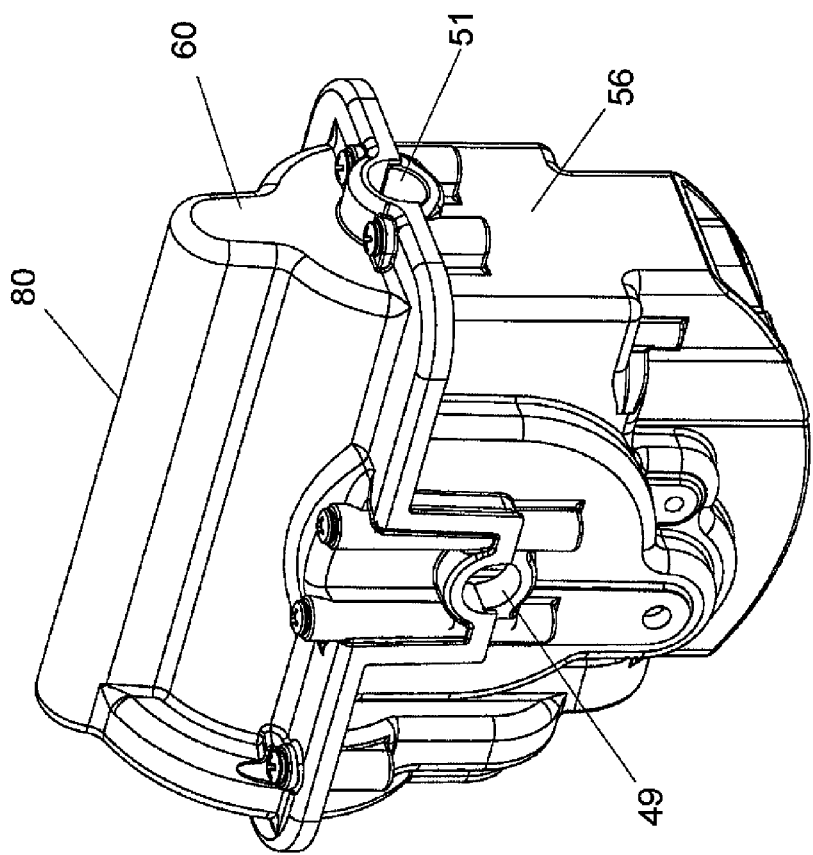
FIG. 14 is a perspective view of the drive housing assembly, which includes the housing and cover connected together with fasteners.

As shown in FIG. 9, a yoke 50 is positioned atop a mast 20. The yoke 50 can be rotationally fixed or not, but is preferably axially fixed to the top of the mast 20. As shown in FIG. 12, the yoke 50 operatively supports a tip axis shaft 52 that is held in place by a cross bolt 54. Preferably, the tip axis shaft 52 rotates relative to the yoke 50 as such tip axis shaft can be driven, as described, for example, below. In the illustrated embodiment, a housing 56 surrounds a tip axis drive mechanism 58, the purpose of which is to controllably drive the tip axis shaft 52 to any desired rotational location within any defined limits of such rotational drive, as may be facilitated by sensors, encoders, limit switches, stepper motors, or the like. A cover 60 is also shown as connected with the housing 56 to completely enclose the tip axis drive mechanism 58 and a tilt axis drive mechanism 62 (not separately described) as follows. Screw fasteners are illustrated, but other connecting techniques are contemplated. Preferably, the housing 56 and cover 60 provide a weather resistant protection to the drive mechanisms, and accommodate tip and tilt axis shafts, as below. See shaft opening 49 formed through the housing 56 and shaft opening 51 partially formed by housing 56 and cover 60 in FIG. 14, where similar openings are provided on opposite component sides (not shown).

Figure 13:
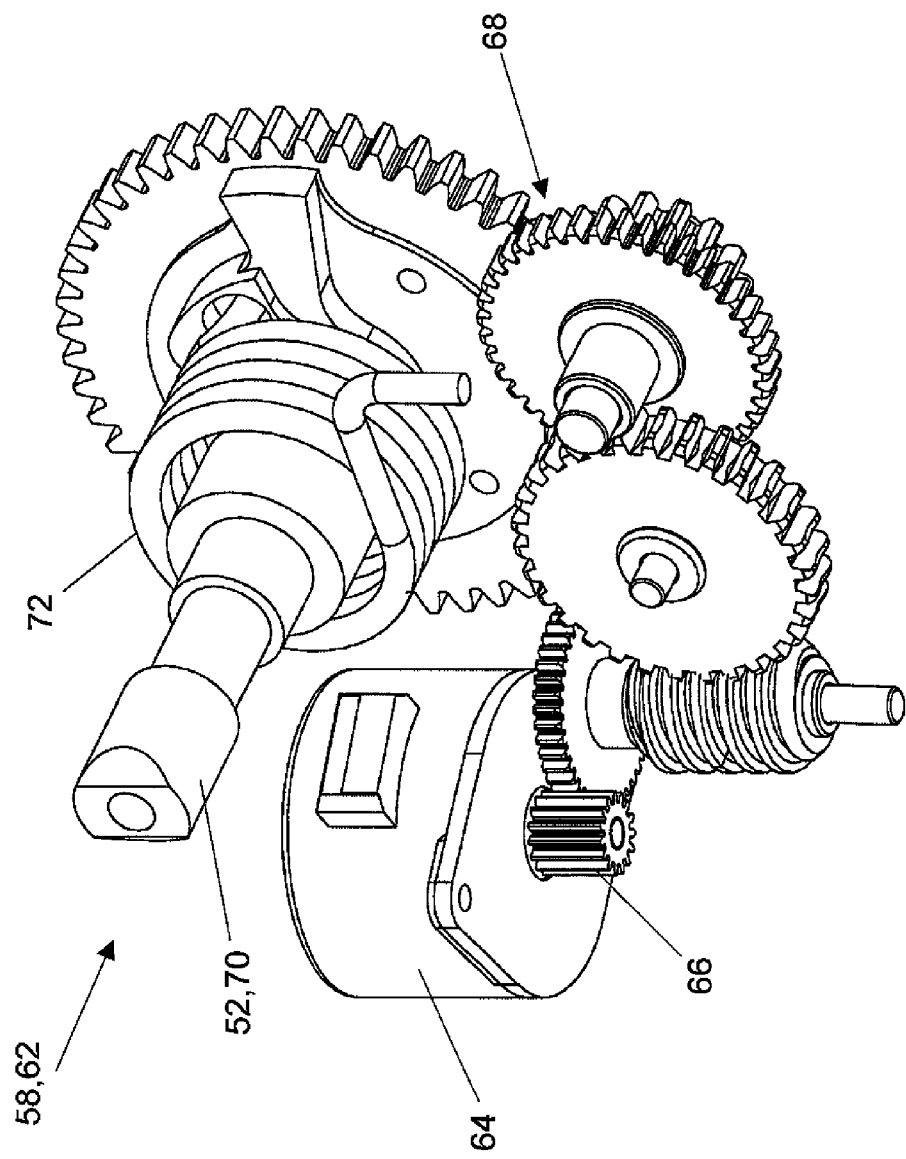
FIG. 13 is a perspective view of representative components that make up a drive train inside a tracker drive assembly or tip/tilt mechanism of the present invention.

FIG. 13 shows a representative example of components that can make up a drive train within either or both of the tip axis drive mechanism 58 and the tilt axis drive mechanism 62. Illustrated is a drive motor 64 that can be any known or developed controllable rotational drive, such as electric motors, stepper motors, and the like. A drive gear 66 is provided on the output shaft of the motor 64, which is used to drive each of the illustrated driven gears, for example, which collection of driven gears is referred to as a drive train 68, the purpose of which is to provide a controlled rotational speed reduction for driving a shaft, which according to the present invention can be either the tip axis shaft 52 or a tilt axis shaft 70. In order to eliminate backlash within the gear drive mechanism, as such backlash can be caused by manufacturing tolerances as they build up within the teeth of the gears in combination, a torsion spring 72 is also preferably provided. The torsion spring 72 provides a bias along the drive train 68 to mesh all gear teeth in a direction to hold the system output, which in this case in the tip and tilt axis shafts 52 and 70, respectively, at a desired rotational position with minimal or no backlash or play in an opposite shaft rotational direction. Such a torsion spring 72 is operatively provided between, for example, a final drive gear that is rotationally fixed directly to either shaft 52 or 70 and a housing or other non-moving component of the tip/tilt mechanism 18 so as to effectively maintain a sufficient torsional force to the drive system, which torsional force varies with the angle of the shaft 52 or 70 based upon an operative connection as described above.

The use of a material with high tensile strength, such as steel, allows these components to be reduced in size while still handling the expected loads. Lower strength materials, such as plastic, can also be used, preferably near the input side of the gear reduction where the forces are lower. Small components have a beneficial cascading effect on the resultant overall housing assembly dimensions and size of the yoke 50, resulting in reduced material usage. Additionally, this design approach, which teaches a compact layout, allows a reflector 16 center of gravity to be moved closer to the respective pivot axes, reducing the biasing effects of the reflector 16 due to gravity, and allowing the use of smaller torsion springs 72. In this design, torsion springs 72, in conjunction with gravity forces acting on the reflector assembly, effectively minimize or eliminate backlash in the drive train and ensure pointing repeatability of reflector 16 positioning. Bias on the output shafts 52 and 70 reduces tolerance requirements on the gears, lowering the cost further.

The use of relatively smaller mirrors (in area) as compared with typical prior art mirrors results in lower wind loads on the drive assembly, making feasible the use the use of low-cost plastics as structural materials for a variety of components. Plastics can be formed using an injection molding process, which also has the added benefit of allowing very complex and accurate geometries. This allows the incorporation of significant functionality into the cover 60 and housing 56, without the need for post-process machining, as might be required with other materials and their associated processes. The use of injection-molded plastics reduces costs associated with material choice, processing, machining, and assembly (due to reduced part count).

Robustness and reliability are enhanced by aspects of the present invention since some or even all of the functional components, such as motors, gears, controllers, electrical connections, etc., can be packaged inside the housing 56 and cover 60 assembly, effectively shielding them from the weather and other outside elements. Working together, the housing 56 and cover 60 create a small, hollow shell structure, which takes good advantage of the material properties for enhanced stiffness characteristics. The cover to housing attachment can be made with fasteners such as screws, or using other methods such as ultrasonic welding or adhesives. Under a variety of loading conditions, the housing assembly stiffness helps improve robustness and reliability by reducing undesirable deflections and stresses. And the small package size helps achieve a large range of motion, without compromising the previously mentioned architectural benefits. This enhanced range of motion allows good energy capture, ease of maintenance/cleaning and the ability to achieve desirable stow positions. Range of motion characteristics are discussed in greater detail below.

Figure 15:
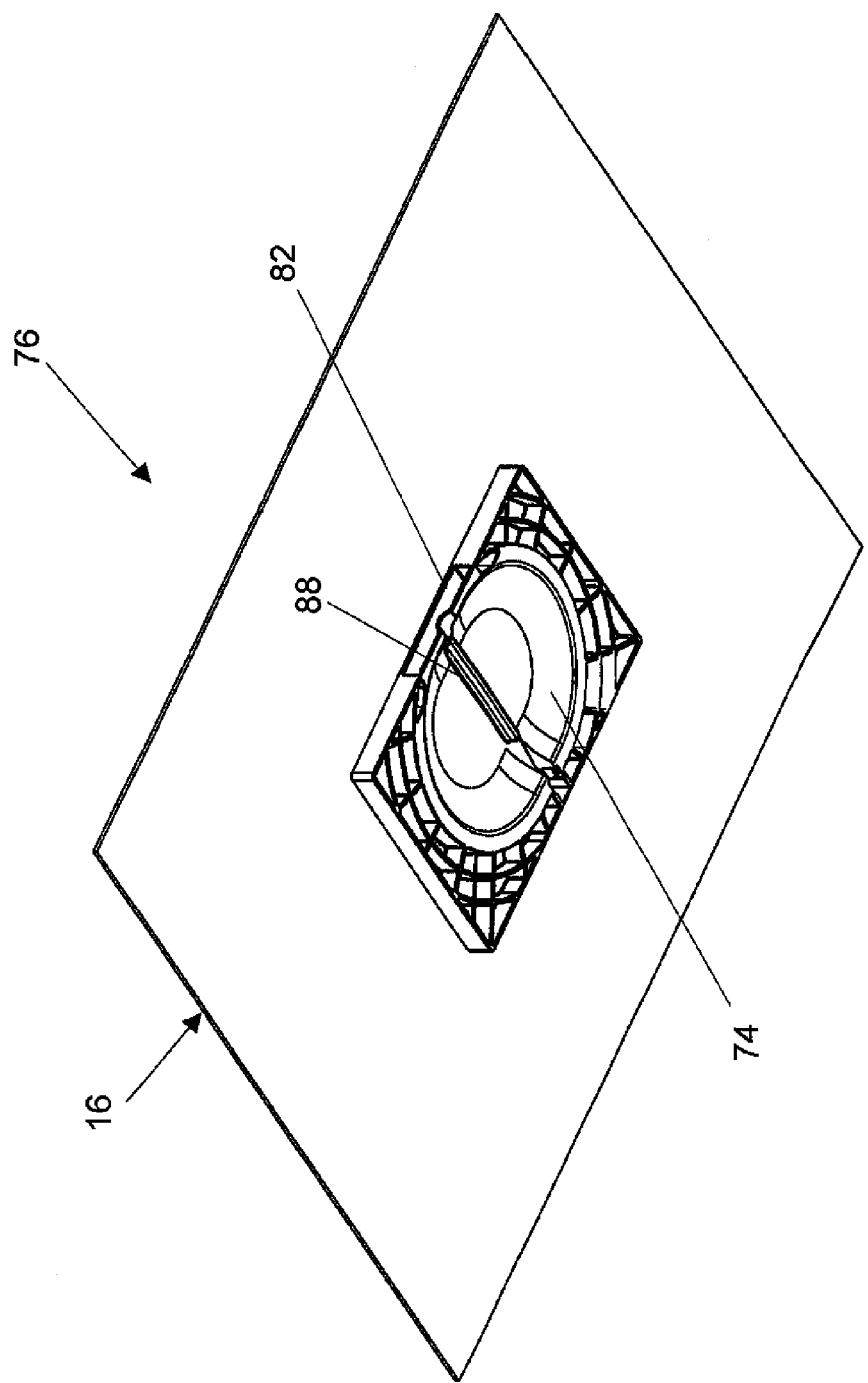
FIG. 15 is a bottom perspective view of a reflector assembly.

The present invention preferably utilizes small reflectors, as compared to conventional reflectors as discussed in the Background section, preferably on the order of about two square meters or less, and more preferably of about one square meter or less. A functional coupling of a tip/tilt mechanism 18 to a reflector 16 can thus be handled by a reflector support structure 74, as shown in FIG. 15, which can be made from injection molded plastic, sheet metal or other appropriate material, and fastened to the reflector using adhesive, such as silicone or double-sided tape, mechanical connectors, or any other known or developed bonding or welding technique. It is also contemplated that the reflector support structure 74 can be made integrally with the reflector 16, such as by any of the previously discuss processes of making the support structure 74 itself. By taking advantage of inherent stiffness properties of the reflector 16, itself, the size and stiffness requirements from a support structure can be advantageously reduced. Again, such a reduction in size provides for the use of less material and/or the use of less-costly materials. A small reflector size can also eliminate the need to add curvature to the reflector, as in prior art larger mirrors, allowing the use of flat, lower cost mirrors. Although the smaller size can require the use of more reflectors for a given energy generation capacity, a reduction in the number of parts within an individual heliostat unit, can otherwise help achieve economies of scale, improve manufacturability, ease shipping & handling and simplify installation.

Figure 17:
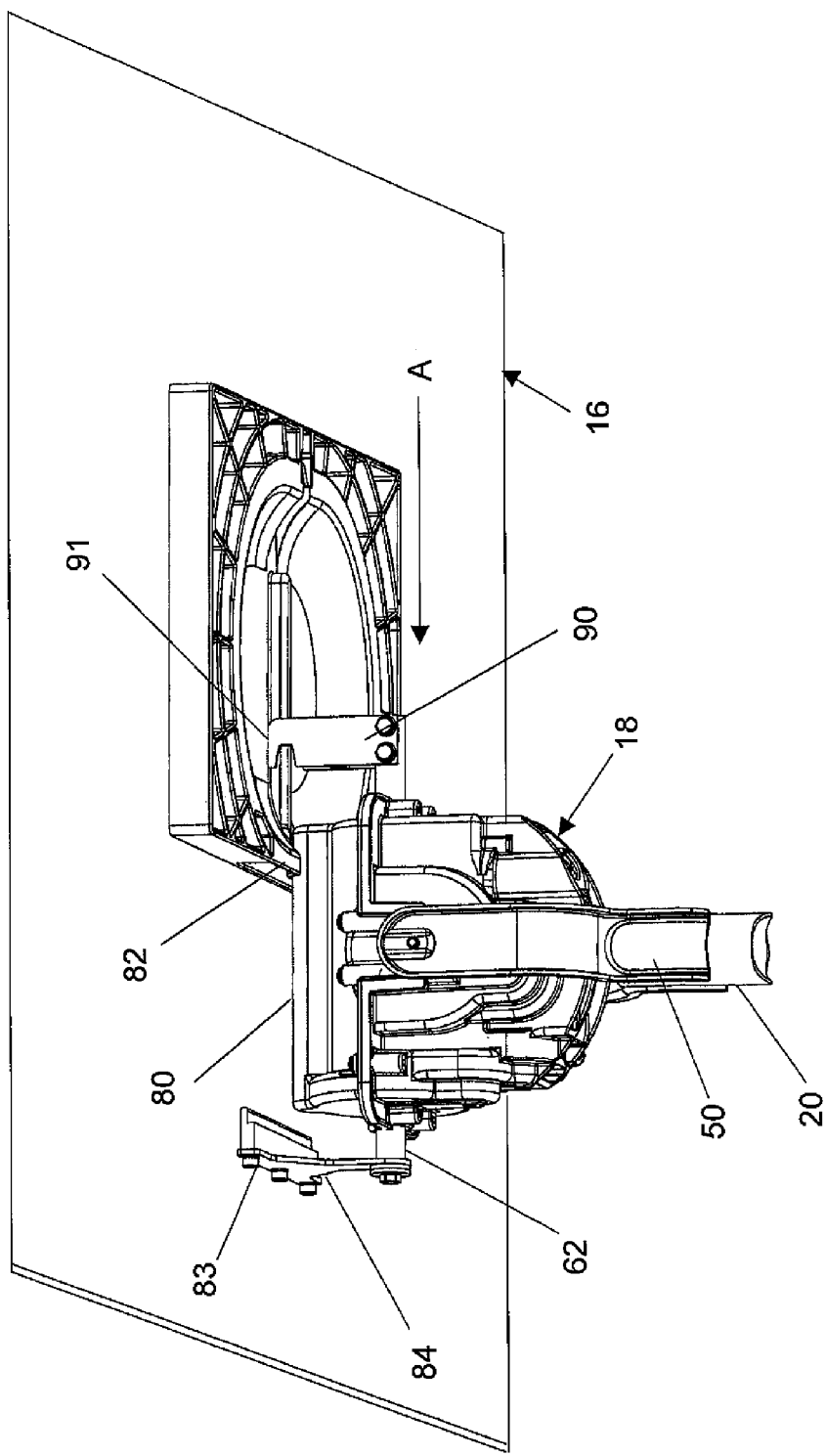
FIG. 17 is a bottom perspective view showing a reflector assembly positioned relative to a tip/tilt mechanism in preparation for installation.
Figure 18:
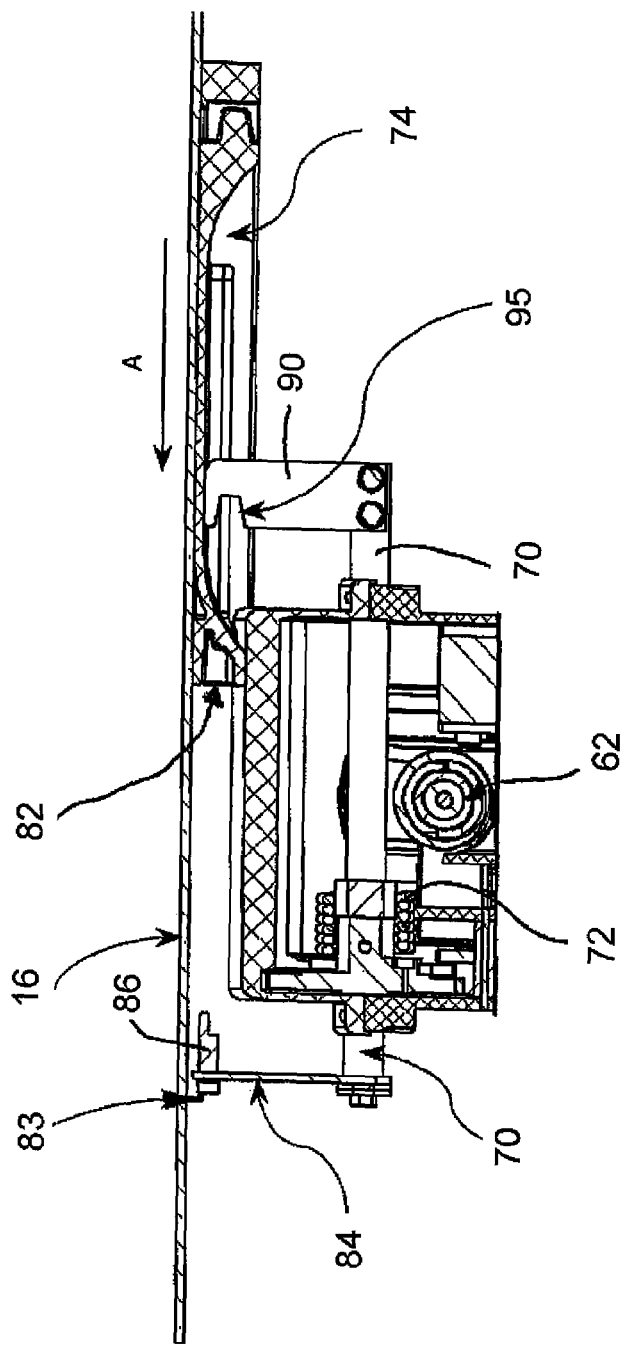
FIG. 18 is a section view showing a reflector assembly positioned relative to a tip/tilt mechanism in preparation for installation.
Figure 19:
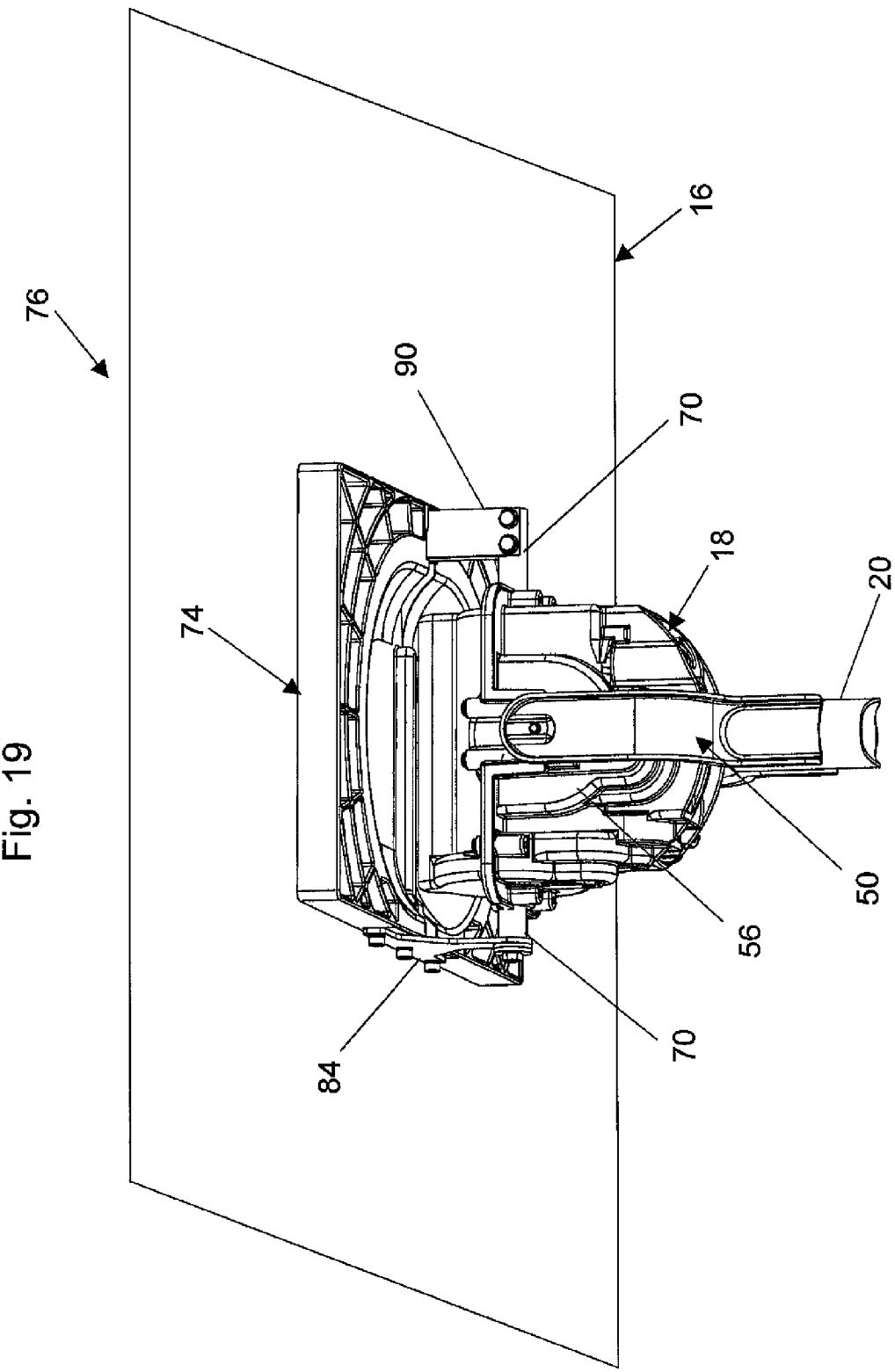
FIG. 19 is a bottom perspective view showing a reflector assembly fully installed onto a tip/tilt mechanism of a tracker module.
Figure 20:
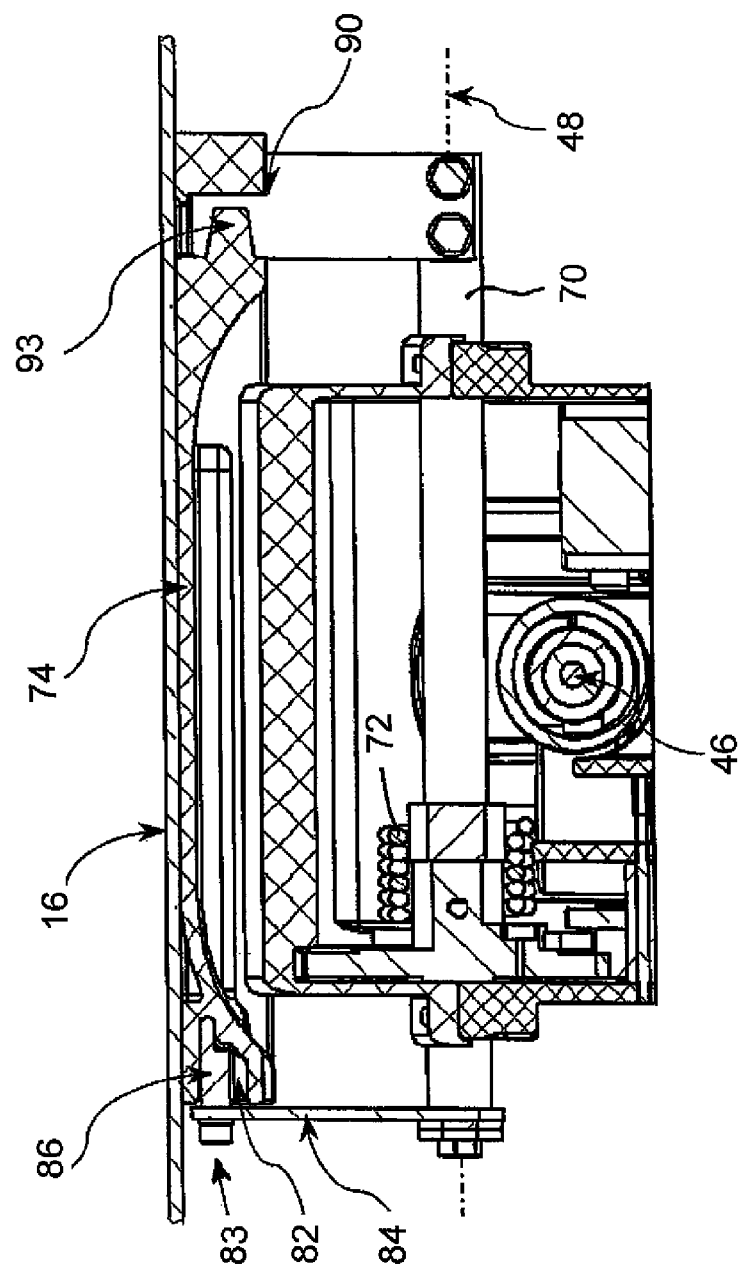
FIG. 20 is a section view showing a reflector assembly fully installed onto a tip/tilt mechanism of a tracker module.

According to another aspect of the present invention, a reflector assembly 76, as comprising a reflector 16 and reflector support structure 74, can be installed to a tip/tilt mechanism 18 without the need for tools. Preferably also, the reflector 16 can then also be disassembled from the tip/tilt mechanism 18 without tools, making a quick-connect/disconnect system. FIGS. 16-20 show an exemplary embodiment for an attachment mechanism that provides preferable functionality. FIGS. 17 and 18 depict a reflector assembly 76 aligned to the housing 56, and in particular for an installation movement to be conducted by movement in the direction of the tilt axis 48, as noted by the arrow A. Preferably there are multiple features that facilitate a correct orientation of the reflector assembly 76 to the tip/tilt mechanism 18 and to guide a reflector assembly 76 relative to the tip/tilt mechanism 18 while an installer slides it the direction A, parallel to the tilt axis shaft 70, prior to full engagement.

One feature aligns a front edge of the reflector support structure 74 to the cover 60 of the housing assembly. A concave recess 78 (shown best in FIG. 16) is preferably formed within the reflector support structure 74 so as to positionable onto a complementary and mating convex ridge 80 that is preferably provided as a formation along the cover 60 for providing lateral alignment of the reflector support structure 74 to the cover 60 and providing a sliding surface against which the recess 78 of the reflector support structure 74 can move during the installation process.

A torque blade receiving slot 82 is also preferably provided at the front edge of the reflector support structure 74 at a height corresponding to a height of a torque blade 83 that is supported in position from an end of the tip axis shaft 70. The torque blade 83 is preferably rotationally fixed with the tilt axis shaft 70 by way of a leaf spring member 84, which connections may utilize bolts or screws, as shown, or any other conventional mechanical, bonding, or welding means. The torque blade receiving slot 82 is preferably shaped to be complementary with an insertable leading portion 86 of the torque blade 83. More preferably, once the leading portion 86 is fully inserted into the receiving slot 82, the fit should be substantially tight so that any torque applied to a reflector assembly 76 will be spread across a top face of the leading portion 86 for enhanced stability of the reflector assembly 76.

Another mating feature that facilitates guiding movement and proper alignment comprises a central rib 88 having guide surfaces 89 (shown best in FIG. 16) as also provided to the reflector support structure 74. A pair of rear spring flanges 90 are preferably provided and rotationally fixed to extend from an opposite end of the tilt axis shaft 70 from the end that is attached to the torque blade 83. The rear spring flanges 90 extend radially similarly as the torque blade 83 in radial direction and distance for providing a plurality of reflector mounting features that are axially spaced along the tilt axis shaft 70. These rear spring flanges 90 are spaced from one another by a distance substantially the same or slightly greater than the width of the central rib 88 so that upon an installation of a reflector assembly 74 by movement in the direction of arrow A, the guide surfaces 89 slide against the inside surfaces of the rear spring flanges 90. The central rib 88 fits between the two rear spring flanges 90 and creates another location that provides lateral alignment to the reflector support structure 74. Additionally, top surfaces 91 of the rear spring flanges 90 are dimensioned to touch and ride along a horizontal flat surface of the reflector support structure 74, providing yet another point of vertical support between the housing assembly of the tip/tilt mechanism 18 and the reflector assembly 76.

As the reflector assembly 76 is advanced fully, the leading portion 86 of the torque blade 83 that is attached to the leaf spring member 84 preferably engages fully within the torque blade receiving slot 82 of the reflector support structure. When the leading portion 86 of the torque blade 83 is fully engaged in the receiving slot 82, such complementary features support the weight of the reflector assembly 76 and also prevent the reflector assembly 76 from vertical movement. Additionally, a connection is also provided that is functional to effectively transmit required torque loads between the tip/tilt mechanism 18, its drive train, and the reflector assembly 76.

Figure 16:
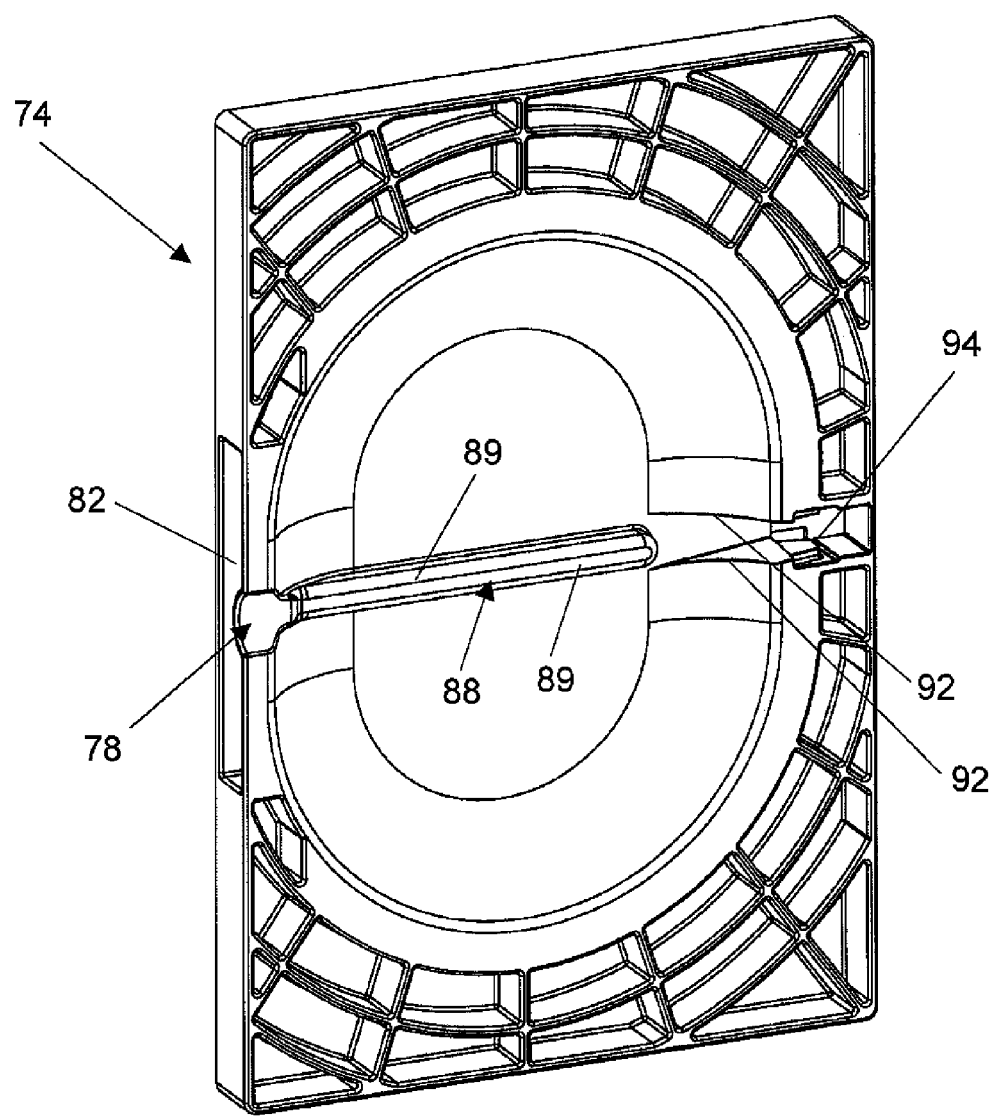
FIG. 16 is a partial bottom perspective view of the reflector support structure.

At the same time during advancement of a reflector assembly 86 that the torque blade 83 engages a front edge of the reflector support structure 74, outside surfaces of the rear spring flanges come into initial contact with tapered cam surfaces 92 that are also provided on the reflector support structure 74, and as best seen in FIG. 16 Beyond the cam surfaces 92, a shaped recess 94 is also preferably provided that is of similar shape to the shape of the rear spring flanges 90, including, in particular, cutouts 95 (see FIG. 18). The cam surfaces 92 converge in the direction of the shaped recess 94. As the rear spring flanges 90 advance relative to the reflector support structure 74, the outside surfaces of the flanges engage with the cam surfaces 92 causing the cantilevered ends of the rear spring flanges 90 to be flexed toward one another. This inward flexing allows the pair of spaced rear spring flanges 90 to pass through a constriction formed at the base of the cam surfaces 92. Once the rear spring flanges 90 are advanced so as to pass this constriction, they can return to their un-flexed positions, thus effectively snapping into position within the shaped recess 94 that is formed into the reflector support structure 74. This shaped recess 94 preferably contains shaped portions corresponding to the cutouts 95 to provide a wedge-shaped locking feature. These mating features help support the weight of the reflector assembly 76 and prevent the rear end of the reflector assembly 76 from moving vertically. To disassemble the reflector 16 from the tip/tilt mechanism, the rear spring flanges 90 can be squeezed together, such as by reaching under the reflector 16 and flexing the rear spring flanges 90 toward one another by hand or the like. Then, by a reverse sliding action, the reflector 16 can be released.

Preferably, the torque blade 83 and the rear spring flanges 90 are spaced from one another axially in the direction of the tilt axis shaft 70 by a distance that provides a biased engagement with the torque blade receiving slot 82 and the shaped recess 94. An effective spring bias can be provided by a flexing of the leaf spring member 84 of the torque blade assembly during a connection process as described above. In a disassembled condition, the distance between a tip of the torque blade 83 and an engagement surface of the mating wedge cutouts of the rear spring flanges 90, is preferably less than a corresponding distance between respective mating features on the reflector support structure 74. During installation, the leaf spring member 84 flexes forward (in the direction of arrow A), compensating for this intentional dimensional difference as provided between the two complementary assemblies. Once the reflector assembly 76 is fully installed the leaf spring member remains in a flexed condition, exerting a compressive force on the opposing mating features of the reflector support structure 74. This spring force ensures a close engagement between the two assemblies, help to prevent unwanted movement between the reflector assembly 74 and the tip/tilt mechanism 18, as well as helping to compensate for manufacturing tolerances. It is also contemplated that the complementary features of the connection mechanism described above can easily be reversed as such elements can be switched with respect to the reflector support structure 74 and the housing assembly and tilt shaft 70 of the tip/tilt mechanism 18.

Another embodiment of this concept replaces the rear spring flanges 90 with another component that is similar in function to the front leaf spring/torque blade assembly 83, 84. This similar component could be placed symmetrically opposite the front leaf spring/torque blade assembly, but attached in a position to the opposite end of the tilt axis output shaft 70. Instead of aligning the reflector assembly roughly parallel to the tilt axis shaft 70 and sliding it forward, as described above, this embodiment could include steps so that the reflector assembly is installed at an angle, first engaging the torque blade 83 into the torque blade receiving slot 82, and then rotating the reflector assembly 76 downward and around an axis roughly parallel to the tip axis 46. A second slot feature can also be formed into the reflector support structure, at a position opposite to the torque blade mating slot 82. A ramped surface could also be provided to engage with a tip of a rear torque blade component, deflecting it in a direction roughly parallel to the tilt axis 48, before allowing it to drop into the second slot feature.

As is the previously described embodiment, a disassembled dimension between the tips of the two opposing torque blade features would preferably be less than the mating features in the reflector support structure, such that in an installed condition both leaf spring components 84 would be deflected or flexed so as to exert a compressive load on the reflector structure. Again, this spring force ensures a close engagement between the two assemblies, helping to prevent unwanted movement between the reflector assembly and the tip/tilt mechanism, as well as helping to compensate for manufacturing tolerances. An additional benefit to this embodiment is that torque output from the drive train can be transmitted to both sides of the reflector support structure, reducing the torsion stiffness requirement of the reflector support structure.

Because a reflector 16 in accordance with preferred embodiments of the present invention is small and light in comparison to prior art reflectors, spring loaded retention mechanisms such as including torsion springs 72 can be sufficiently stiff to accurately hold the reflector 16 in place under expected operational drive-torque, gravity and wind loads. At the same time, a single person can install a reflector 16, easily overcoming the retention mechanism spring force and to positively engage the reflector 16 in position. This is achieved without the need for any tools, through a combination of the retention mechanism and spring feature design. In contrast, the prior art employs more substantial fastening mechanisms between the reflector and drive assemblies, typically requiring the use of lifting equipment and tools.

The present invention also includes methods for achieving a sufficient biasing torque throughout out the energy capture envelope to ensure the minimization of pointing inaccuracies due to backlash in the gear drive trains. This externally applied bias torque effectively eliminates the negative pointing characteristics caused by gear backlash, by keeping the gear teeth engaged at all times. The required minimum bias torque is mostly dependent on the expected torques exerted by wind loads on the reflector. This method utilizes gravity torque exerted on the gear drive trains due to the mass of the reflector assembly and/or the drive, combined with the use of torsion springs 72.

The present invention also includes certain design and packaging layouts that allow the tracker modules 12 to achieve a range of motion around each axis equivalent to at least plus or minus 90 degrees from the horizontal (under a normal installation). Such an extreme range of motion ensures that the tracker module 12 can meet all pointing and maintenance/cleaning requirements, independent of its position and orientation relative to the receiver or target 22. The ability to stow the reflector 16 in a position 90 degrees or more off the horizontal when the tracker module 12 is not in use reduces dust and dirt accumulation. This results in a higher average optical efficiency for a given cleaning schedule, or a reduced cleaning schedule to maintain a given optical efficiency. Additionally, since the reflector assembly 76 can be oriented vertically at any circumferential position around the mast 20, under higher wind conditions mirror planes can be roughly oriented with the predominant wind direction to reduce loading on the tracker module assembly, while still getting the benefits of reduced dust accumulation afforded by the vertical orientation. FIG. 10 shows a reflector 16 in an orientation with the reflector 16 rotated approximately 90 degrees around both the tip and tilt axes 46 and 48, respectively. FIG. 11 shows a reflector 16 in a vertical orientation rotated approximately 90 degrees around the tip axis 46.

The present invention also includes methods for managing the movement and position of electrical wires entering a tracker drive housing while limiting unwanted tensile stresses in the wires. A wire entering the tip/tilt mechanism 18 can be used to provide power to electric motors 64, and carry signals to and from other components that may be packaged within the housing assembly, such as limit switches, encoders and motor controllers. As such, the wires serve an important function and must be protected from damage so they will function adequately throughout the life of the product. Also, minimizing the tensile forces in the wires is important since these loads may negatively affect the biasing torque on the tip axis 46, as discussed above.

Wire management is preferred to be designed into a tip/tilt mechanism 18 of the present invention because a distance between an exit point of a wire out from the housing 56 of a tip/tilt mechanism 18 and a bottom of a mast 20 changes as the tip/tilt mechanism 18 rotates about the tip axis 46.

One method for accommodating this distance change is to add an extendable helical segment 96 to a wire 98, allowing it to stretch elastically when the tip/tilt mechanism 18 rotates the tilt axis 48 around the tip axis 46 into positions where the tilt axis 48 is angled relative to the horizontal. As the tilt axis 48 rotates in a direction closer to horizontal, a spring force exerted by the helical segment 96 preferably also facilitates wire retraction to reduce the chance of the wire 98 bunching up and/or binding between the housing 56 and the yoke 50, since this could cause damage. Alternatively, for retraction, a weight can be operatively attached to the wire 98 inside of the mast 20, providing sufficient wire slack below the weight to accommodate the required vertical motion.

Figure 21:
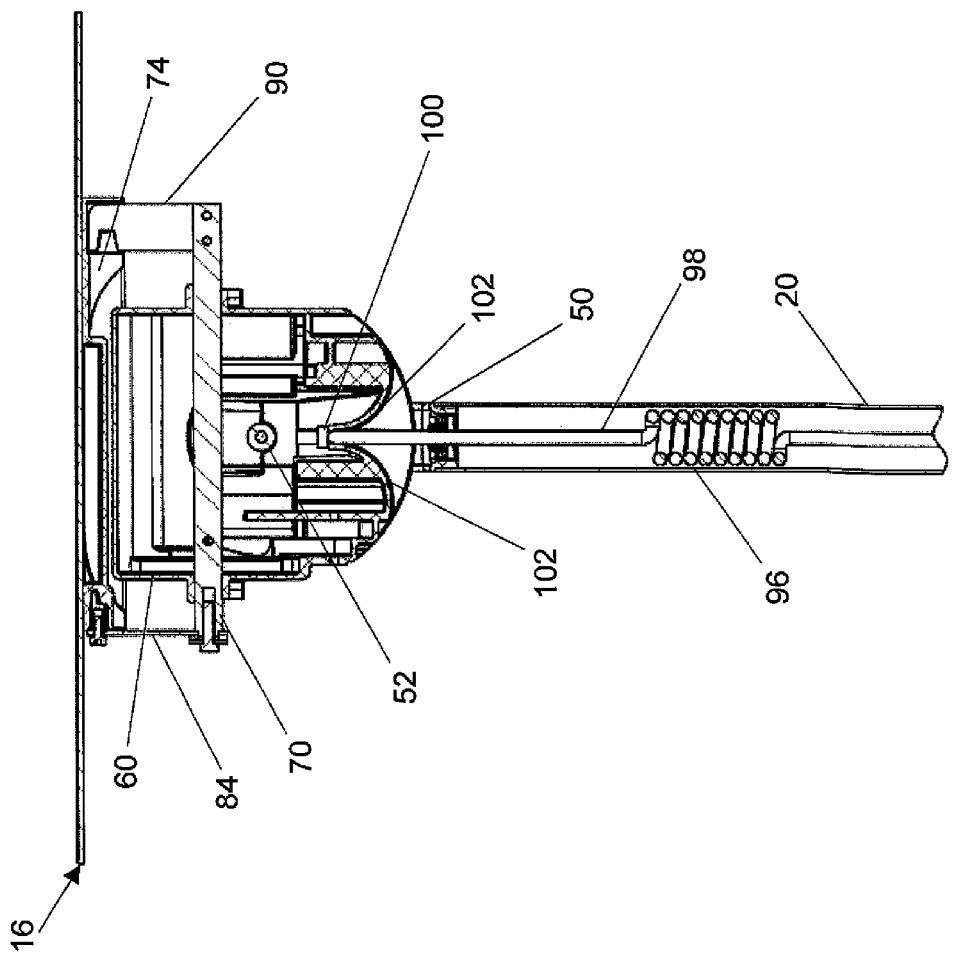
FIG. 21 is a section view showing one version for electrical wiring inside a mast when the reflector assembly is in a horizontal orientation.

In addition to accommodating length changes of one or more wires 98, a wire circuit preferably also can include strain relief features so as to withstand any tensile force it may experience. An opening through which a wire 98 enters the housing 56 can act as a strain relief and can be supplemented by a clip component 100 (shown in FIG. 21) that may be secured around the wire 98 just inside the housing 56, such as may comprise a cable tie. Also, contoured surfaces 102 of the housing 56 can facilitate and guide any wrapping and unwrapping of a wire 98 in a controlled manner, so that a contact area between the wire 98 and the housing 56 can act to provide additional strain relief.

Figure 22:
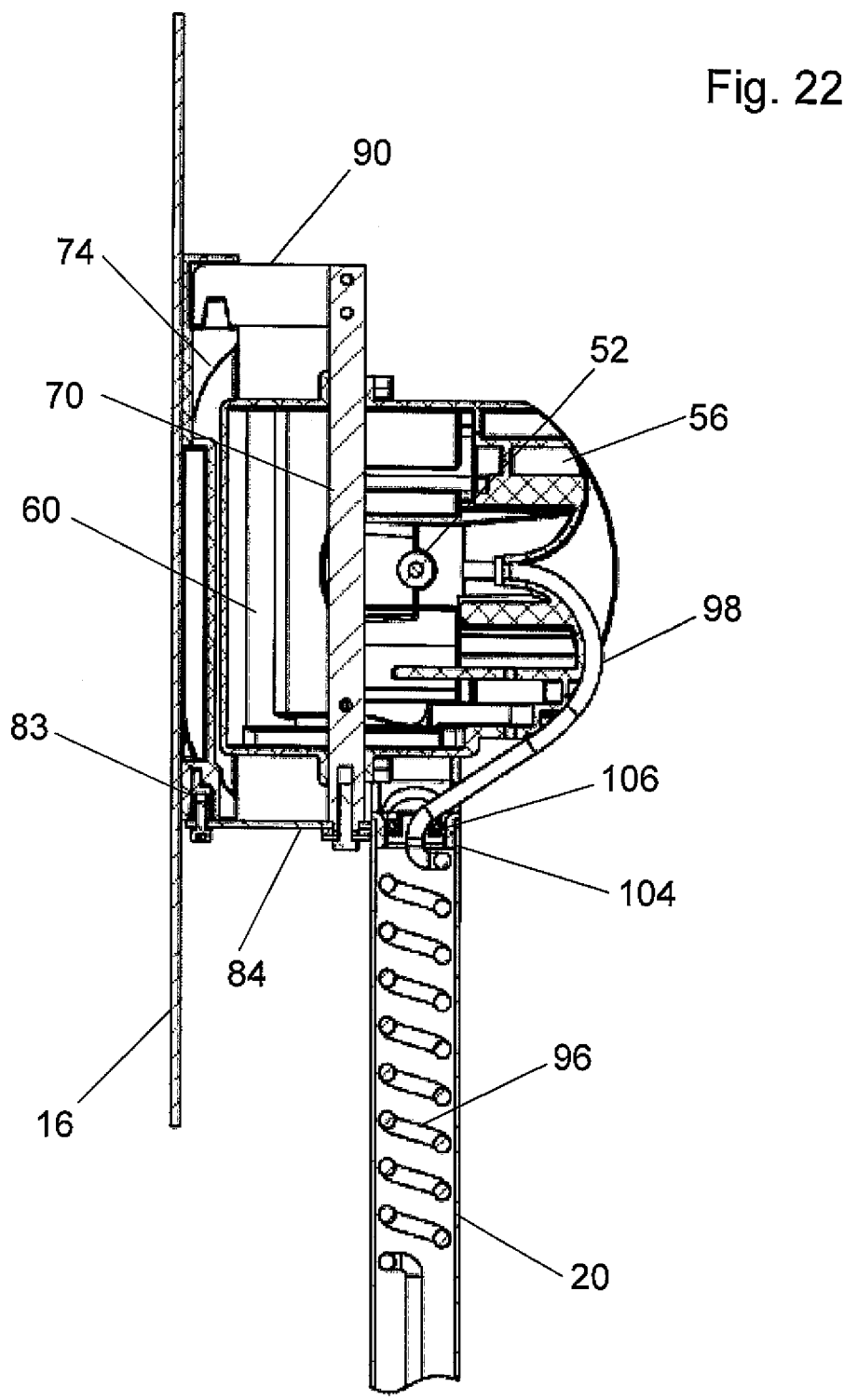
FIG. 22 is a section view showing electrical wiring inside the mast when the reflector assembly is in a vertical orientation after being rotated 90 degrees about the tilt axis.

When a wire 98 extends due to the rotation of the tip/tilt mechanism 18 around the tip axis 46, the wire changes direction as it exits the top of the main mast and wraps around the housing 56. This can result in contact between the wire 98 and a top edge of the mast 20, which also can cause added friction and result in unwanted tensile loads in the wire 98. One design approach to reduce this friction is to move the top edge of the mast 20 further away from the housing 56, to reduce an effective wrap angle of the wire 98 around the top edge of the mast 20. Another approach employs the use of a grommet 104 that can be made of low-friction material. Such a grommet 104 can be added near the top of the mast 20 so the wire can slide more easily. Friction can be reduced even further by adding small rollers 106 (see FIG. 22) at the top of the mast 20 that make contact with the wire 98, thereby allowing it to pass by the top edge of the main mast with little resistance.

Figure 23:
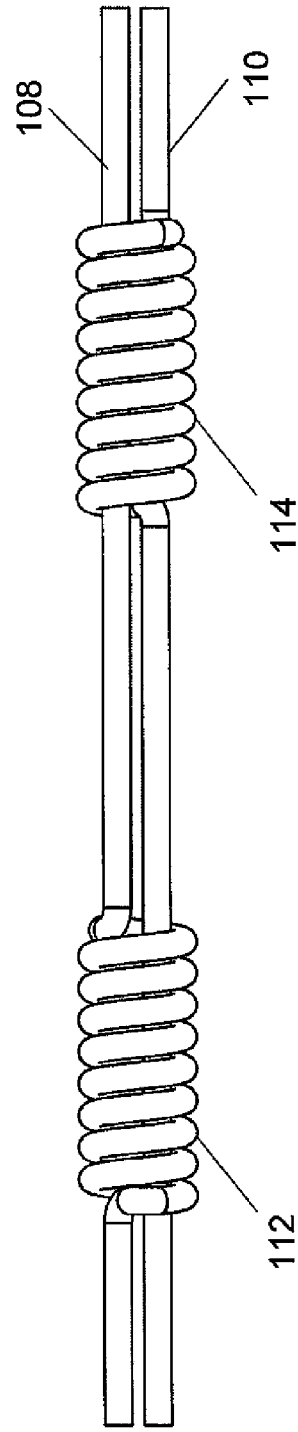
FIG. 23 shows two nested wires with helical segments in a retracted position.
Figure 24:
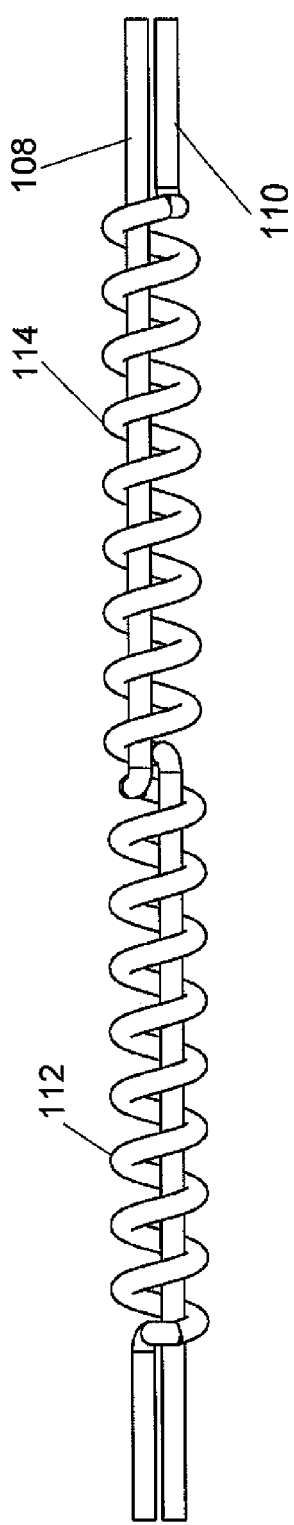
FIG. 24 shows two nested wires with helical segments in a extended position.

Depending on how many wires enter the housing 56, as well as the inside diameter limitations of the mast 20, a challenge exists to create a wire layout design that meets extension and retraction requirements, while minimizing tensile loads exerted on the wires. To this end, it is desirable to allow the wires within a tubular mast 20 to move freely without binding against the inside surfaces. A wire retraction design that uses a helical segment 96, as described above, should therefore be smaller in diameter in its un-extended state than the inside dimensions of the mast 20. Additionally, for a design that requires two separate wires routed through the mast 20, a method for nesting said wires to achieve the required low friction against the tube inside diameter, as well as between one wire and the other, is desirable. FIGS. 23 and 24 show two wires 108 and 110 with helical segments 112 and 114 nested in a way that achieves this functionality. The straight segment of one wire passes inside the helical coil of the other wire and vice versa. When extending, the wires pass by each other with minimal contact, limiting any dragging friction force. Additionally, due to the nesting, the wires remain within the diameter limit defined by the inside dimensions of the mast 20.

Figure 25:
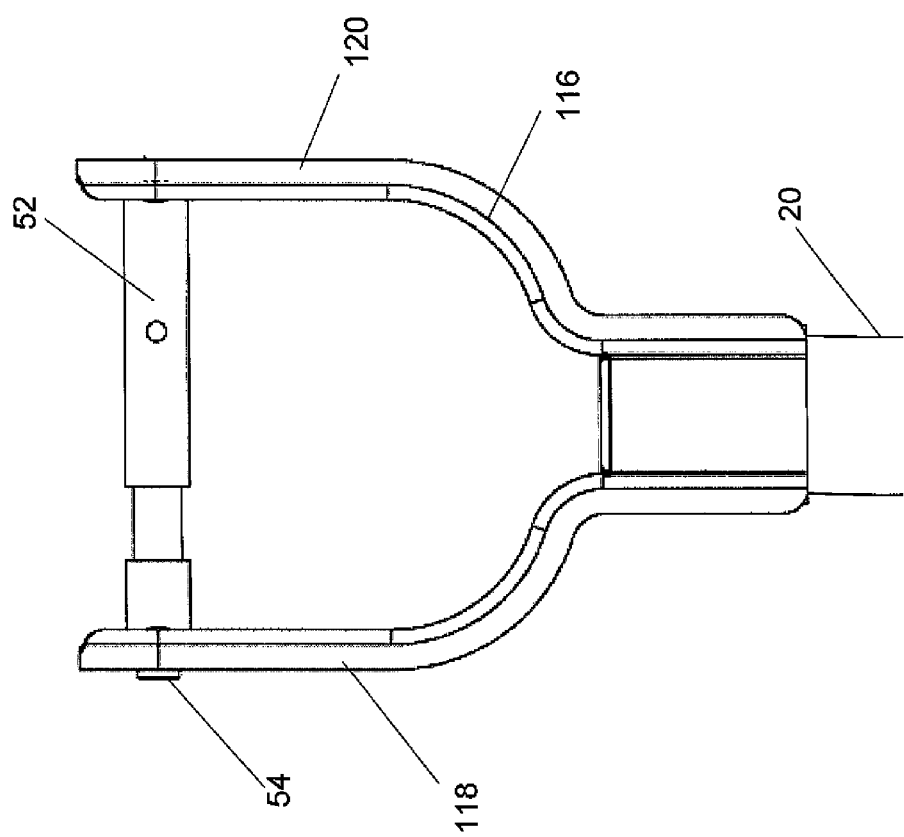
FIG. 25 shows a front view of the yoke with the tip axis shaft installed.
Figure 26:
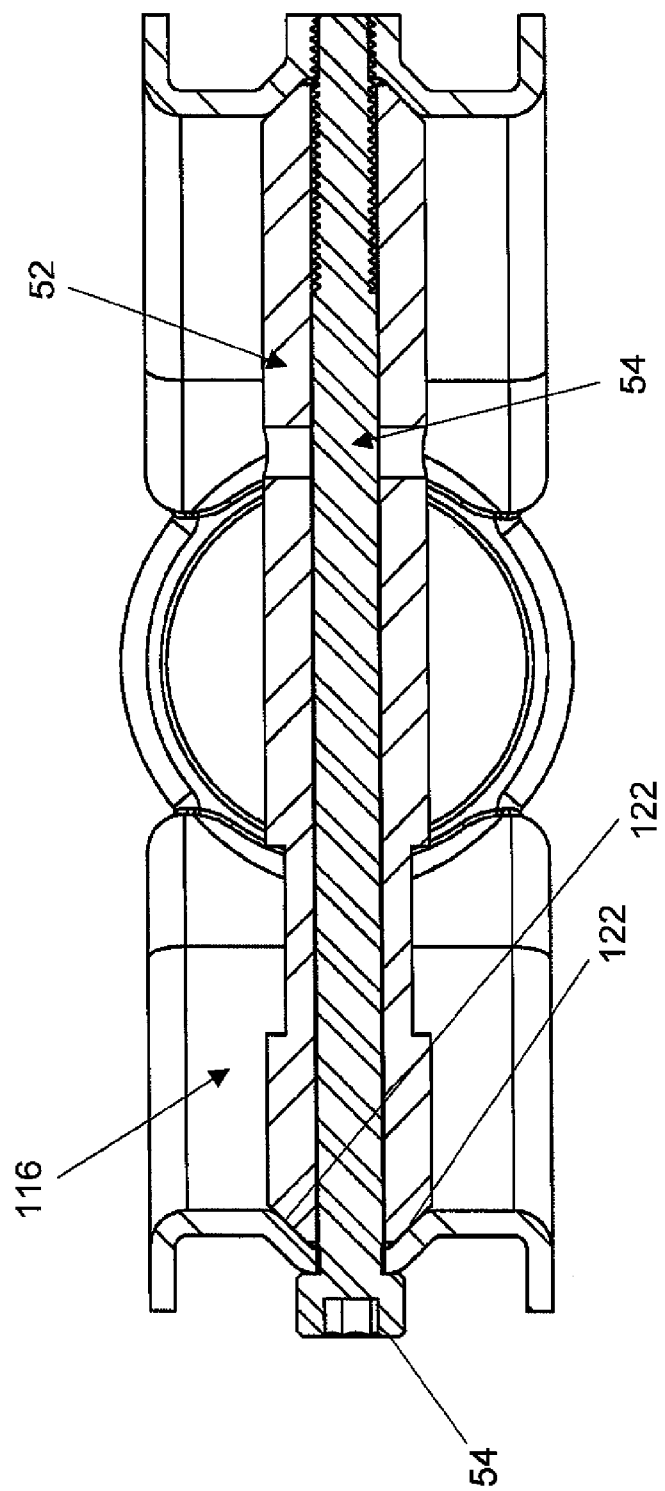
FIG. 26 shows a top section view of the yoke with tip axis shaft installed, with the cross-section cut through the tilt axis shaft centerline.

The present invention is also directed to a configuration for achieving high stiffness values in a yoke assembly 116, without significantly increasing the beam section of the yoke arms 118 and 120. By rigidly connecting the yoke arms 118 and 120 and the tip axis shaft 52, utilizing a cross bolt 54 and wedging surfaces 122, the overall assembly stiffness increases considerably. See FIGS. 25 and 26. This is beneficial from a standpoint of minimizing the physical size of the yoke 50, since it is one of the components that helps define the range of motion limits on a reflector 16. When a reflector assembly 76 is rotated around the tilt axis 48, it is the clearance between the yoke assembly 116 and the reflector support structure 74 that limits the total angular motion about that axis. See FIG. 12. In a preferred production configuration the yoke 50 is made from two pieces of stamped and bent sheet metal attached to the main mast tube.

What is claimed is:

1. A kit for supporting and providing a controlled range of motion to a device including a tracker module and the device,
    the tracker module comprising: a frame structure including at least a mast; a tip/tilt mechanism supported by the frame structure and comprising a housing for operatively supporting a tip shaft that is rotational along a tip axis and a tilt shaft that is rotational along a tilt axis that is oriented at an angle to the tip axis;
    a first mounting feature on the tip/tilt mechanism that is rotational with one of the tip shaft and the tilt shaft, that is mounted at an end of such one shaft with a spring bias to connect the tip/tilt mechanism to the device, and that is shaped to engage and disengage with a complementary feature of the device to be supported by the tracker module by flexing of at least a portion of the first mounting feature; and
    a second mounting feature on the tip/tilt mechanism that is also rotational with the same one shaft as the first mounting feature, that is mounted at an opposite end of said same one shaft with a spring bias configured to connect the tip/tilt mechanism to the device, and that is also shaped to engage and disengage with a complementary feature of the device to be supported by the tracker module, and wherein the second mounting feature is cantilevered from the tip/tilt mechanism and flexes to pass a cam surface on the device, providing a deflection of the second mounting feature when the device is installed on the tip/tilt mechanism, and wherein the second mounting feature snaps into the complementary feature after passing the cam surface to provide a biased connection between the tip/tilt mechanism and the device;
    wherein a spacing between the first and second mounting features as axially positioned along the one of the tip shaft and the tilt shaft causes a bias force to be created between the flexing first mounting feature and second mounting feature when the device is assembled to the tracker module.

2. The kit of claim 1, wherein the device comprises a reflector and a reflector support structure, the reflector support structure including a third mounting feature that is complementary to the first mounting feature and a fourth mounting feature that is complementary to the second mounting feature, and wherein the third and fourth mounting features are spaced from one another within the reflector support structure so as to cause a flexing of the first mounting feature as the device is mounted to the tracker module and to cause the first mounting feature to remain flexed sufficiently to create the bias force between the first mounting feature and the second mounting feature.

3. The kit of claim 1, wherein the first mounting feature and the second mounting feature are connected with the tilt shaft, which tilt shaft is rotational coupled to the tip axis and is rotatable about the tip axis.

4. The kit of claim 3, wherein the first mounting feature comprises a blade element and a first leaf spring that connects the blade clement to the tip/tilt mechanism and wherein the leaf spring flexes for a biased engagement to the third mounting feature that is complementary to the first mounting feature of the device to be supported by the tracker module.

5. The kit of claim 4, wherein the second mounting feature comprises a pair of spring flanges that are mounted to the tip/tilt mechanism at an axially spaced location from the first mounting feature, which spring flanges interact with a complementary feature of the device to flex inward during connection of the device to the tip/tilt mechanism and snap outward to provide a snap-fit connection of the device to the tip/tilt mechanism.

6. The kit of claim 2, wherein the first mounting feature comprises a blade element and a first leaf spring element that connects the blade element to the tip/tilt mechanism and wherein the leaf spring flexes to create a biased force between the first and second mounting features and wherein the third mounting feature comprises a receiving slot within the reflector support structure that is sized and shaped similarly to the blade element of the first mounting feature so that a torque applied to the reflector is transmitted to the tilt shaft by way of the receiving slot and the blade element.

7. The kit of claim 2, wherein the second mounting feature comprises a pair of spring flanges that are mounted to the tip/tilt mechanism at an axially spaced location from the first mounting feature, which spring flanges interact with the fourth mounting feature of the reflector, which fourth mounting feature comprises (i) at least one cam surface of the reflector support structure for guiding and deflecting at least one of the spring flanges during a snap-fit connection of the reflector to the tip/tilt mechanism; and (ii) a shaped recess of the reflector support structure into which a spring flange snaps to lock the reflector to the tip/tilt mechanism.

8. The kit of claim 1, wherein the first and second mounting features are shaped to engage and disengage with the respective complementary features without the need for any tools.

9. The kit of claim 2, wherein the device is configured to be slidably disengaged from the tracker module while squeezing and flexing the pair of spring flanges toward one another.

10. A heliostat comprising a reflector, a reflector support structure, and a tracker module for providing a controlled range of motion to the reflector, the heliostat comprising:
as the tracker module:
a frame structure including at least a mast;
a tip/tilt mechanism supported by the frame structure and comprising a housing for operatively supporting a tip shaft that is rotational along a tip axis and a tilt shaft that is rotational along a tilt axis that is oriented at an angle to the tip axis;
a first mounting feature on the tip/tilt mechanism that is rotational with one of the tip shaft and the tilt shaft, that is mounted at an end of such one shaft with a spring bias to connect the tip/tilt mechanism to the reflector support structure and that is shaped to engage and disengage with a complementary feature of the reflector support structure to be supported by the tracker module by flexing of at least a portion of the first mounting feature; and
a second mounting feature on the tip/tilt mechanism that is also rotational with the same one shaft as the first mounting feature, that is mounted at an opposite end of said same one shaft with a spring bias to connect the tip/tilt mechanism to the reflector support structure, and that is also shaped to engage and disengage with a complementary feature of the reflector support structure to be supported by the tracker module, and wherein the second mounting feature is cantilevered from the tip/tilt mechanism and flexes to pass a cam surface on the reflector support structure, providing a deflection of the second mounting feature when the reflector support structure is installed on the tip/tilt mechanism, and wherein the second mounting feature snaps into the complementary feature after passing the cam surface to provide a biased connection between the tip/tilt mechanism and the reflector support structure;
wherein a spacing between the first and second mounting features as axially positioned along the one of the tip shaft and the tilt shaft causes a force to be created between the flexing first mounting feature and second mounting feature when the reflector support structure to be supported by the tracker module is assembled to the tracker module;
and as the reflector support structure configured to be mounted to the reflector:
a third mounting feature that is complementary to the first mounting feature; and
a fourth mounting feature that is complementary to the second mounting feature,
wherein the third and fourth mounting features are spaced from one another so as to cause a flexing of the first mounting feature as the reflector is mounted to the tracker module and to cause the first mounting feature to remain flexed sufficiently to create the force between the first mounting feature and the second mounting feature.

11. The heliostat of claim 10, wherein the first mounting feature comprises a blade element and a first leaf spring that connects the blade element to the tip/tilt mechanism and wherein the leaf spring flexes to create a biased force between the first and second mounting features and wherein the third mounting feature comprises a receiving slot within the reflector support structure that is sized and shaped similarly to the blade element of the first mounting feature so that a torque applied to the reflector is transmitted to the tilt shaft by way of the receiving slot and the blade element.

12. The heliostat of claim 11, wherein the second mounting feature comprises a pair of spring flanges that are mounted to the tip/tilt mechanism at an axially spaced location from the first mounting feature, which spring flanges interact with the fourth mounting feature of the reflector, which fourth mounting feature comprises (i) at least one cam surface of the reflector support structure for guiding and deflecting at least one of the spring flanges during a snap-fit connection of the reflector to the tip/tilt mechanism; and (ii) a shaped recess of the reflector support structure into which a spring flange snaps to lock the reflector to the tip/tilt mechanism.

13. The heliostat of claim 10, wherein the first and second mounting features are shaped to engage and disengage with the respective complementary features without the need for any tools.

14. The heliostat of claim 12, wherein the reflector support structure is configured to be slidably disengaged from the tracker module while squeezing and flexing the pair of spring flanges toward one another.

* * * * *